(12) United States Patent
Herrou et al.

(10) Patent No.: US 12,287,215 B2
(45) Date of Patent: Apr. 29, 2025

(54) WEAR MITIGATION ROUTING PLATFORM

(71) Applicant: Rivian IP Holdings, LLC, Plymouth, MI (US)

(72) Inventors: Philippe Herrou, Aptos, CA (US); Christopher R. Conklin, San Francisco, CA (US); Parker Richard Williams, Claremont, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 222 days.

(21) Appl. No.: 17/960,088

(22) Filed: Oct. 4, 2022

(65) Prior Publication Data

US 2024/0110800 A1 Apr. 4, 2024

(51) Int. Cl.
| | | |
|---|---|---|
| *G01C 21/34* | (2006.01) | |
| *G01C 21/36* | (2006.01) | |
| *G06N 3/08* | (2023.01) | |
| *G07C 5/00* | (2006.01) | |
| *G07C 5/08* | (2006.01) | |

(52) U.S. Cl.
CPC ..... *G01C 21/3461* (2013.01); *G01C 21/3697* (2013.01); *G06N 3/08* (2013.01); *G07C 5/006* (2013.01); *G07C 5/008* (2013.01); *G07C 5/0808* (2013.01)

(58) Field of Classification Search
CPC .. G01C 21/3461; G01C 21/3697; G06N 3/08; G07C 5/006; G07C 5/008; G07C 5/0808
See application file for complete search history.

(56) References Cited

U.S. PATENT DOCUMENTS

| | | | |
|---|---|---|---|
| 2011/0219330 A1* | 9/2011 | Ando | G09B 29/10 715/784 |
| 2017/0045890 A1* | 2/2017 | Gurin | G06Q 50/40 |
| 2018/0259350 A1* | 9/2018 | Al-Hamad | G01C 21/188 |
| 2019/0009904 A1* | 1/2019 | Winkle | G05D 1/0055 |
| 2022/0236070 A1* | 7/2022 | Glasgow | G08G 1/096888 |

OTHER PUBLICATIONS

CARFIT. (Date Unknown). "Predicting maintenance needs by listening to your car", Revvo technologies.pdfLocated at: https://web.archive.org/web/20220326033937/https://car.fit/en/ Retrieved Oct. 7, 2022,16 pages.
REVVO. "What is Revvo?", 2022 Revvo Technologies, Inc. located at: https://www.revvo.ai, retrieved Oct. 5, 2022, 18 pages.

\* cited by examiner

*Primary Examiner* — Seth A Silverman
(74) *Attorney, Agent, or Firm* — Patterson + Sheridan, LLP

(57) ABSTRACT

A method for assessing driving routes to mitigate wear on a vehicle may include determining a driving route traversed by a vehicle, the driving route including an origin and a destination. The method may include receiving signals generated by a number of sensors built into specific locations on the vehicle, the sensors including at least one vibration sensor. The method may include assessing wear on the vehicle due to one or more wear mechanisms based on the signals. The method may include identifying a correlation between the driving route and the assessed wear on the vehicle, transmitting information associated with the correlation between the driving route and the assessed wear on the vehicle, receiving a routing recommendation based on information about an alternate route, and displaying the routing recommendation.

16 Claims, 12 Drawing Sheets

WEAR MITIGATION ROUTING PLATFORM

Vehicle components may experience degradation or wear over time due to wear mechanisms such as vibration or friction. Different surfaces may cause different amounts of wear on vehicle components. There may be surfaces and/or road defects that only appear in certain areas (e.g., streets, lanes, etc.).

SUMMARY

Embodiments of the present disclosure are directed to vehicle control systems, methods, and computer readable mediums for monitoring surface characteristics and assessing driving routes to mitigate wear on a vehicle. The systems and methods of the present disclosure can monitor a surface, such as a road surface, to identify surface characteristic (e.g., road texture, potholes, cracks, bumps, curbs, speed bumps, etc.) based on sensor signals from sensors built into specific locations on the vehicle and can generate/assess driving routes to mitigate wear on vehicle components based on the identified surface characteristics, thereby reducing wear on vehicle components, vehicle downtime, and maintenance costs.

One implementation of the present disclosure is a method for assessing driving routes to mitigate wear on a vehicle. In some embodiments, the method includes determining, by a control module of the vehicle, a driving route traversed by the vehicle, the driving route comprising an origin and a destination. In some embodiments, the method includes receiving, by a control module of the vehicle during traversal of the driving route, signals generated by a number of sensors built into specific locations on the vehicle. In some embodiments, the sensors include at least one vibration sensor. In some embodiments, the method includes assessing, by the control module of the vehicle based on the signals, wear on the vehicle due to one or more wear mechanisms, identifying, by the control module of the vehicle, a correlation between the driving route and the assessed wear on the vehicle, and transmitting, by a telecommunications module of the vehicle to a vehicle data analysis system, information associated with the correlation between the driving route and the assessed wear on the vehicle. In some embodiments, the method includes receiving, by the telecommunications module from the vehicle data analysis system, a routing recommendation based on information about an alternate route and displaying, by a display module of the vehicle, the routing recommendation.

In some embodiments, assessing the wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals. In some embodiments, assessing the wear on the vehicle includes determining a measure of fatigue cycles associated with a component of the vehicle based on at least a portion of the signals. In some embodiments, identifying the correlation between the driving route and the assessed wear includes identifying, by the control module of the vehicle based on the signals, a surface characteristic associated with the driving route, comparing, by the control module of the vehicle, a measurement associated with the assessed wear to a threshold to generate a result, and correlating, by the control module of the vehicle based on the identified surface characteristic and the result, a location associated with the driving route to a portion of the assessed wear.

In some embodiments, transmitting the information associated with the correlation includes transmitting the location and the portion of the assessed wear. In some embodiments, identifying the correlation between the driving route and the assessed wear includes classifying the surface characteristic based on the signals. In some embodiments, transmitting the information includes transmitting the classification of the surface characteristic. In some embodiments, the surface characteristic includes at least one of: (i) a road texture, (ii) a pothole, (ii) a speed bump, (iii) a crack, (iv) raveling, (v) a curb, or (vi) a parking block. In some embodiments, the routing recommendation includes the alternate route. In some embodiments, the alternate route is correlated with a lower level of wear than the driving route. In some embodiments, the routing recommendation identifies a road lane not included in a number of road lanes associated with the driving route. In some embodiments, the routing recommendation is correlated with a lower level of wear than the driving route.

Another implementation of the present disclosure is a vehicle system for assessing driving routes to mitigate wear on a vehicle including a number of sensors built into specific locations on the vehicle, a display, one or more non-transitory computer-readable storage media, and one or more processors coupled to the one or more storage media. In some embodiments, the number of sensors include at least one vibration sensor. In some embodiments, the one or more non-transitory computer-readable storage media include instructions. In some embodiments, the one or more processors are configured to execute the instructions to determine a driving route traversed by the vehicle, the driving route comprising an origin and a destination. In some embodiments, the one or more processors are configured to execute the instructions to receive signals generated during traversal of the driving route by the number of sensors, assess, based on the signals, wear on the vehicle due to one or more wear mechanisms, and identify a correlation between the driving route and the assessed wear on the vehicle. In some embodiments, the one or more processors are configured to execute the instructions to transmit, to a vehicle data analysis system, information associated with the correlation between the driving route and the assessed wear on the vehicle, receive, from the vehicle data analysis system, a routing recommendation based on information about an alternate route, and display, using the display, the routing recommendation.

In some embodiments, assessing the wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals. In some embodiments, assessing the wear on the vehicle includes determining a measure of fatigue cycles associated with a component of the vehicle based on at least a portion of the signals. In some embodiments, identifying the correlation between the driving route and the assessed wear includes identifying, by the control module of the vehicle, a surface characteristic associated with the driving route, comparing, by the control module of the vehicle, a measurement associated with the assessed wear to a threshold to generate a result, and correlating, by the control module of the vehicle based on the identified surface characteristic and the result, a location associated with the driving route to a portion of the assessed wear.

In some embodiments, transmitting the information associated with the correlation includes transmitting the location and the portion of the assessed wear. In some embodiments, identifying the correlation between the driving route and the assessed wear includes classifying the surface characteristic based on the signals. In some embodiments, transmitting the information includes transmitting the classification of the surface characteristic. In some embodiments, the surface characteristic includes at least one of: (i) a road texture, (ii) a pothole, (ii) a speed bump, (iii) a crack, (iv) raveling, (v) a curb, or (vi) a parking block. In some embodiments, the routing recommendation includes the alternate route, and wherein the alternate route is correlated with a lower level of wear than the driving route. In some embodiments, the alternate route identifies a road lane not included in the driving route. In some embodiments, the alternate route is correlated with a lower level of wear than the driving route.

Another implementation of the present disclosure is a non-transitory computer-readable medium comprising instructions. In some embodiments, when executed by one or more processors of one or more computing devices, the instructions cause the one or more processors to determine a driving route traversed by a vehicle, the driving route comprising an origin and a destination. In some embodiments, the instructions cause the one or more processors to receive signals generated by a number of sensors built into specific locations on the vehicle, the signals generated during traversal of the driving route. In some embodiments, the sensors include at least one vibration sensor. In some embodiments, the instructions cause the one or more processors to assess, based on the signals, wear on the vehicle due to one or more wear mechanisms, identify a correlation between the driving route and the assessed wear on the vehicle, cause a telecommunications module to transmit to a vehicle data analysis system information associated with the correlation between the driving route and the assessed wear on the vehicle, receive, from the vehicle data analysis system, a routing recommendation based on information about an alternate route, and cause a display of the vehicle to display the routing recommendation.

In some embodiments, assessing the wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals.

Another implementation of the present disclosure is a method for assessing driving routes to mitigate wear on a vehicle. In some embodiments, the method includes receiving, by one or more servers associated with a vehicle data analysis system from the vehicle, information related to a driving route traversed by the vehicle, the driving route comprising an origin and a destination, and receiving, by the one or more servers from the vehicle, signals generated by a number of sensors built into specific locations on the vehicle. In some embodiments, the sensors include at least one vibration sensor. In some embodiments, the method includes assessing, by the one or more servers based on the signals, wear on the vehicle due to one or more wear mechanisms, identifying, by the one or more servers, a correlation between the driving route and the assessed wear on the vehicle, assessing, by the one or more servers, an alternate route based on a comparison between (1) the correlation between the driving route and the assessed wear on the vehicle and (2) historical vehicle sensor information received for the alternate route, and transmitting, by the one or more servers to the vehicle, a recommendation based on the assessed alternate route.

In some embodiments, assessing the wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals. In some embodiments, applying the ML model includes applying a convolutional neural network. In some embodiments, receiving the signals includes receiving a location associated with a surface characteristic associated with the driving route. In some embodiments, the surface characteristic includes at least one of: (i) a road texture, (ii) a pothole, (ii) a speed bump, (iii) a crack, (iv) raveling, (v) a curb, or (vi) a parking block.

In some embodiments, identifying the correlation between the driving route and the assessed wear includes identifying, by the one or more servers based on the signals, a surface characteristic associated with the driving route, comparing, by the one or more servers, a measurement associated with the assessed wear to a threshold to generate a result, and correlating, by the one or more servers based on the identified surface characteristic and the result, the location associated with the surface characteristic to a portion of the assessed wear. In some embodiments, assessing the alternate route includes evaluating an objective function having a number of parameters, the number of parameters including (i) route travel time, (ii) route travel distance, and (iii) route predicted wear. In some embodiments, assessing the alternate route includes generating a prediction for wear associated with the alternate route. In some embodiments, transmitting the recommendation includes transmitting the alternate route.

Another implementation of the present disclosure is a vehicle system including one or more computing devices including one or more non-transitory computer-readable storage media including instructions and one or more processors coupled to the one or more storage media. In some embodiments, the one or more processors are configured to execute the instructions to receive, from a vehicle, information related to a driving route traversed by the vehicle, the driving route comprising an origin and a destination, receive, from the vehicle, signals generated by a number of sensors built into specific locations on the vehicle. In some embodiments, the sensors include at least one vibration sensor. In some embodiments, the instructions cause the one or more processors to assess, based on the signals, wear on the vehicle due to one or more wear mechanisms, identify a correlation between the driving route and the assessed wear on the vehicle, assess an alternate route based on a comparison between (1) the correlation between the driving route and the assessed wear on the vehicle and (2) historical vehicle sensor information received for the alternate route, transmit to the vehicle a recommendation based on the assessed alternate route.

In some embodiments, assessing the wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals. In some embodiments, applying the ML model includes applying a convolutional neural network. In some embodiments, receiving the signals includes receiving a location associated with a surface characteristic associated with the driving route. In some embodiments, the surface characteristic includes at least one of: (i) a road texture, (ii) a pothole, (ii) a speed bump, (iii) a crack, (iv) raveling, (v) a curb, or (vi) a parking block. In some embodiments, identifying the correlation between the driving route and the assessed wear includes identifying, based on the signals, a surface characteristic associated with the driving route, comparing a measurement associated with the assessed wear to a threshold to generate a result, and correlating, based on the identified surface characteristic and the result, the location associated with the surface characteristic to a portion of the assessed wear.

In some embodiments, assessing the alternate route includes evaluating an objective function having a number of parameters, the number of parameters including (i) route travel time, (ii) route travel distance, and (iii) route predicted wear. In some embodiments, assessing the alternate route includes generating a prediction for wear associated with the alternate route. In some embodiments, transmitting the recommendation includes transmitting the alternate route.

Another implementation of the present disclosure is a non-transitory computer-readable medium including instructions. In some embodiments, the instructions, when executed by one or more processors of one or more computing devices, the instructions cause the one or more processors to receive, from a vehicle, information related to a driving route traversed by the vehicle, the driving route comprising an origin and a destination and receive, from the vehicle, signals generated by a number of sensors built into specific locations on the vehicle. In some embodiments, the sensors include at least one vibration sensor. In some embodiments, the instructions cause the one or more processors to assess, based on the signals, wear on the vehicle due to one or more wear mechanisms, identify a correlation between the driving route and the assessed wear on the vehicle, assess an alternate route based on a comparison between (1) the correlation between the driving route and the assessed wear on the vehicle and (2) historical vehicle sensor information received for the alternate route, and transmit to the vehicle a recommendation based on the assessed alternate route.

In some embodiments, assessing the wear on the vehicle includes at least one of: (i) applying a machine learning (ML) model trained to predict component wear to at least a first portion of the signals, (ii) applying a transfer function to at least a second portion of the signals, or (iii) generating a frequency domain representation of at least a third portion of the signals.

The disclosed embodiments are only examples, and the scope of this disclosure is not limited to them. Particular embodiments may include all, some, or none of the components, elements, features, functions, operations, or steps of the embodiments disclosed. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
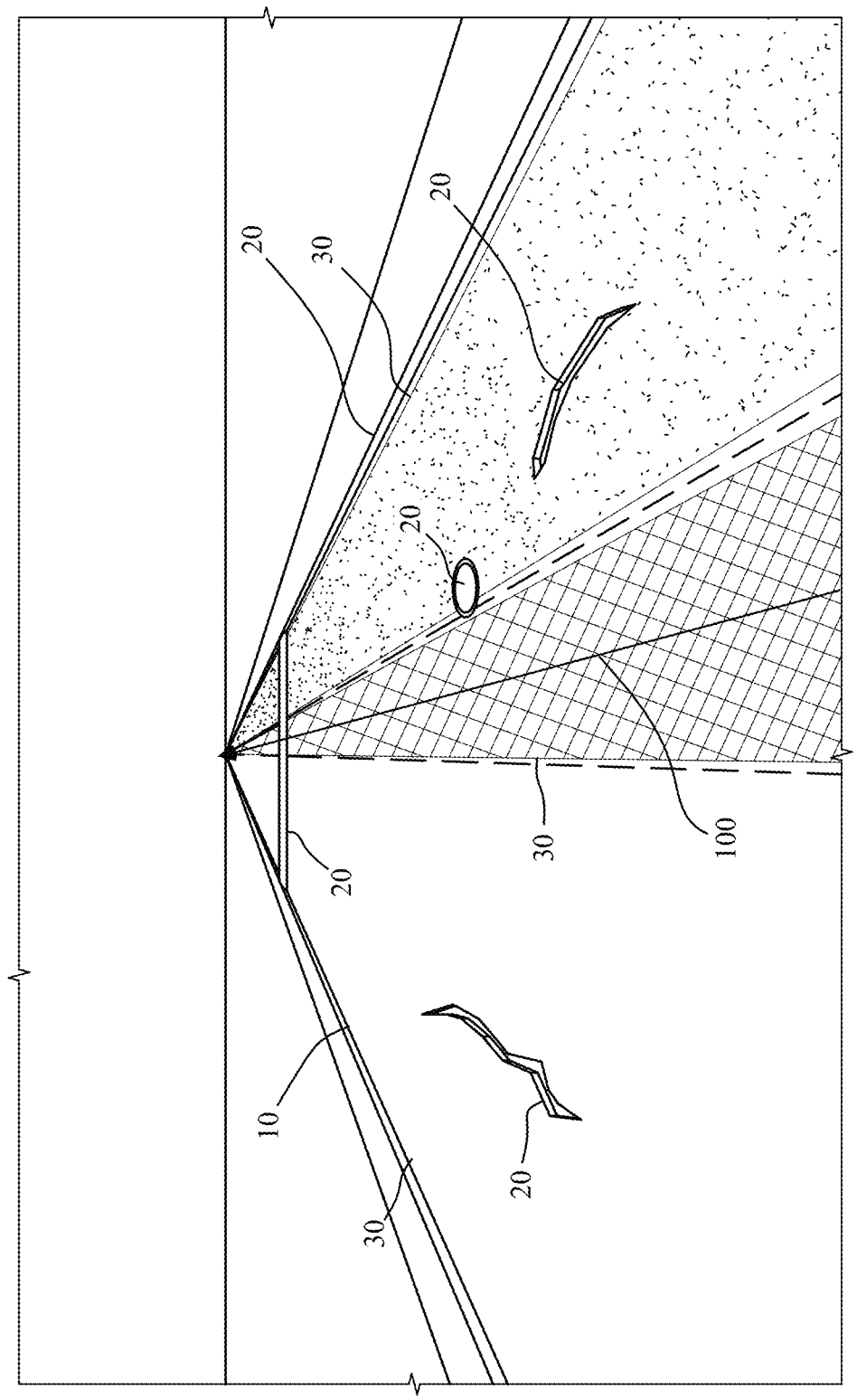
FIG. 1A illustrates an example of identifying surface characteristics along a route.

Embodiments of the present disclosure are directed towards vehicle control systems, methods, and computer readable mediums for mapping road surface characteristics and generate driving routes to mitigate wear on a vehicle. Specifically, systems and methods of the present disclosure enable continuous monitoring of road surface characteristics (e.g., how rough a road surface is, whether there are any unexpected bumps, cracks, potholes, etc.) to determine an amount of vehicle wear associated with various routes and to generate routing recommendations that reduce vehicle wear. In various embodiments, vehicles are fitted with a number of high-bandwidth tri-axial accelerometers to facilitate monitoring for mechanical wear. The information from the accelerometers may be integrated with other signals generated by the vehicle inside a module on board the vehicle to allow for real-time, synchronous processing to provide an indication of an amount of wear experienced by the vehicle. The indication of the amount of wear experienced by the vehicle may be correlated with location data (e.g., a GPS location, etc.) to generate a mapping of road characteristics associated with vehicle wear. The mapping of road characteristics may be used to analyze routes to mitigate wear on the vehicle and/or other vehicles that travel the route. For example, a fleet management system may adjust a delivery route to use a specific lane over a stretch of road that has fewer potholes, thereby reducing wear on delivery vehicles.

Speaking now generally, the platform may collect a number of signals from sensors embedded in a vehicle. In some embodiments, an on-board module receives the signals. Additionally or alternatively, a cloud-based data processing system (e.g., a vehicle data analysis system, etc.) may receive the signals. For example, the on-board module may receive a first set of signals and perform a first type of analysis (e.g., physics-based analysis, etc.) on the first set of signals and a cloud-based data processing system may receive a second set of signals and perform a second type of analysis (e.g., AI-based analysis, etc.) on the second set of signals. The signals may be associated with a health of the vehicle/vehicle components (e.g., vibration data, sound data, data describing torque applied to a component of the vehicle, etc.), a user's operation of the vehicle (e.g., steering angle data, throttle/brake pedal apply data, wheel speed data, drive unit speed/torque data, etc.), and/or an environmental context of the vehicle (e.g., ambient temperature data, data describing a following distance of the vehicle, data describing characteristics of a road surface the vehicle is traveling on, etc.). For example, the signals may include vibration data corresponding to vibrations experienced by the vehicle/vehicle components due to characteristics of a road surface (e.g., potholes, raveling, a speed bump, a curb, an obstruction, etc.) the vehicle is traveling on. Additionally or alternatively, the signals may include image data of a road surface the vehicle is traversing.

In various embodiments, the on-board module and/or the cloud-based data processing system analyze the signals to identify and map road surface characteristics. For example, the on-board module may monitor vibration data to identify patterns in vibration data associated with road surface characteristics and may correlate the patterns with a location. In various embodiments, the on-board module and/or the cloud-based data processing system generate a data structure representing the location of the identified road surface characteristics. For example, the cloud-based data processing system may generate a map including a number of identified road surface characteristics each associated with a location on the map (e.g., a GPS location, a specific road lane, etc.). In some embodiments, the on-board module and/or the cloud-based data processing system classify/label the identified road surface characteristics. For example, the on-board module may analyze image data using an artificial intelligence (AI) model to identify a portion of the image data as indicating the presence of a speed bump and may save the classification in a data structure (e.g., a ledger, etc.). As another example, the on-board module may analyze vibration data to identify a frequency signature associated with a pothole and may save the classification in a data structure. In some embodiments, classifying identified road surface characteristics includes differentiating between macro events (e.g., surface characteristics experienced over an extended period of time such as a road texture, etc.) and micro events (e.g., surface characteristics experienced momentarily such as a pothole, etc.). As a non-limiting example, a micro event may include a surface characteristic that causes a perturbation to a vehicle for less than four seconds and a macro event may include a surface characteristic that causes a perturbation to a vehicle for longer than ten seconds. Additionally or alternatively, classifying identified road surface characteristics may include differentiating between temporary/transient surface characteristics (e.g., a piece of debris in the road, a piece of ice, etc.) and non-temporary surface characteristics (e.g., a speedbump, a pothole, etc.).

In various embodiments, the on-board module and/or the cloud-based data processing system may monitor vehicle/vehicle component wear and store a measure of the wear in the data structure. For example, the on-board module may monitor vibration data to identify vibrations indicative of a road surface characteristic (e.g., by comparing the vibration data to a threshold, etc.), may calculate a measure of wear associated with each road surface characteristic (e.g., by applying a transfer function to the vibration data and/or computing a rainflow matrix therefrom, etc.), and may generate a map including the measure of wear associated with each road surface characteristic (e.g., where the measure of wear is associated with a location, etc.). In various embodiments, for each identified road surface characteristic the data structure includes (i) a location, (ii) a classification of the road surface characteristic, (iii) a time, (iv) a measure of wear associated with the road surface characteristic, and/or (v) sensor signals associated with the road surface characteristic (e.g., vibration data used to identify a frequency signature indicative of the road surface characteristic, etc.).

In various embodiments, the on-board module and/or the cloud-based data processing system train a model to identify road surface characteristics using feedback. For example, the on-board module may train a convolutional neural network (CNN) autoencoder using historical vibration data (e.g., indicating vibrations experienced by a vehicle/vehicle component as a result of traversing a road surface) and historical service data (e.g., indicating what wear the vehicle/vehicle components experienced, etc.) to identify patterns in vibration data that are correlated with vehicle/vehicle component wear. As another example, the on-board module may train a statistical model (e.g., a regression model, etc.) using health metrics (e.g., a measure of vehicle/vehicle component wear computed from vibration data, etc.), location data, and/or service data.

In various embodiments, the on-board module and/or the cloud-based data processing system continuously monitor wear experienced by a vehicle/vehicle component and correlate the wear to a driving route. For example, the cloud-based data processing system may analyze wear accumulated by a number of vehicles in a fleet while traversing a number of delivery routes to identify portions of the delivery routes correlated with accelerated vehicle/vehicle component wear. In various embodiments, the on-board module and/or the cloud-based data processing system generate alternate routes based on the correlations. For example, the on-board module may identify a correlation between increased vehicle wear and a lane of a road corresponding to a portion of a delivery route and may generate an alternate route to avoid the lane (e.g., by using a different lane, by using a different road, etc.). Accelerated vehicle/vehicle component wear may include wear that is beyond the rate of normal wear accumulation expected for a certain operating condition.

In various embodiments, the platform (e.g., the cloud-based data processing system and/or the on-board module, etc.) proactively generates recommendations based on correlating stored health metrics with other data. For example, the platform may correlate trends in component wear with location data to identify portions of road associated with accelerated wear on the vehicle (e.g., due to potholes, a rough road surface, an excess of speed bumps, etc.) and may generate routing recommendations to avoid such portions (e.g., by using a different road, using a different lane, etc.).

In some embodiments, the on-board module and/or the cloud-based data processing system respond to real-time routing requests. For example, the on-board module may receive a routing request associated with an origin and a destination, may analyze a number of candidate routes based on (i) a distance associated with each of the candidate routes, (ii) a time associated with traversing each of the candidate routes, (iii) traffic associated with each of the candidate routes, (iv) fees (e.g., tolls, etc.) associated with each of the candidate routes, (v) an environmental impact associated with each of the candidate routes, (vi) driving conditions associated with each of the driving routes (e.g., whether the route is over mountainous terrain, whether the route includes roundabouts, etc.), and/or (vii) wear associated with each of the candidate routes (e.g., an amount of wear the vehicle is expected to accumulate while driving the route due to surface characteristics such as road texture or the presence of potholes, etc.), and may generate a routing recommendation based on the analysis of the number of candidate routes.

In some embodiments, the on-board module and/or the cloud-based data processing system generate recommendations to adjust the operation of a fleet of vehicles. For example, the cloud-based data processing system may correlate a first driving route with accelerated wear associated with front tires of a first number of vehicles assigned to the first driving route, may correlate a second driving route with accelerated wear associated with rear tires of second number of vehicles assigned to the second driving route, and may reassign the first number of vehicles to the second driving route and the second number of vehicles to the first driving route to mitigate the impact of the wear associated with the first and second driving routes (e.g., by promoting a more even tire wear for the first number of vehicles and the second number of vehicles, etc.). In some embodiments, the on-board module and/or the cloud-based data processing system generate routing recommendations to mitigate wear on a specific vehicle component. For example, the cloud-based data processing system may correlate a portion of a road with accelerated wear of a front-left strut of vehicles that traverse the portion of the road (e.g., due to a pothole, etc.), may receive a routing request from a vehicle, may query a data structure storing a ledger of accumulated wear associated with each component of the vehicle to determine that a front-left strut of the vehicle is approaching a wear threshold (e.g., the front-left strut needs to be serviced soon, etc.), and may generate a routing recommendation for the vehicle that avoids the portion of the road, thereby reducing wear on the front-left strut of the vehicle and extending an operational life of the vehicle/front-left strut.

In various embodiments, the on-board module and/or the cloud-based data processing system analyze vibration data, image data, and/or sound data to generate one or more health metrics associated with the vehicle/vehicle components. In various embodiments, the health metrics include a measurement of wear such as vibration-based wear and/or strain-based wear. For example, the on-board module may apply a transfer function to vibration data to determine strain at a component and may compute an accrued rainflow matrix using the strain at the component to generate a measurement of strain-based wear for the component. In various embodiments, the on-board module and/or the cloud-based data processing system update a database with the one or more health metrics. For example, the on-board module may compute strain-based wear associated with a component of a vehicle accumulated over a 24-hour period and may update a database entry associated with the vehicle to include the accumulated strain-based wear. The database may store various metrics associated with a vehicle, a fleet of vehicles, and/or the like.

Turning now to FIG. 1A, an example of identifying surface characteristics along a route is shown, according to an exemplary embodiment. In various embodiments, a vehicle may traverse a route (shown as route 100) from an origin to a destination. Route 100 may proceed along road 10 having lanes 30. Road 10 may include a number of surface characteristics 20 (shown as a manhole cover, a number of cracks, a speedbump, and a curb). Surface characteristics 20 may include an obstacle, a pothole, raveling, a bump, a grade crossing, a texture, and/or the like. In various embodiments, different portions of road 10 include different surface characteristics. For example, a first lane of road 10 may have a first texture (shown using crosshatching) and a second lane of road 10 may have a second texture (shown using stippling). In various embodiments, the different surface characteristics produce different amounts of wear on a vehicle/vehicle component (e.g., due to forces such as vibrations imparted on the vehicle/vehicle components as a result of interacting with the surface characteristic, etc.). To continue the previous example, the first lane of road 10 may have a smooth texture that produces a first amount of wear on a vehicle and the second lane of road 10 may have a rough texture that produces a second amount of wear on the vehicle that is greater than the first amount of wear.

In various embodiments, systems and methods of the present disclosure facilitate identification of surface characteristics 20. For example, an on-board module of a vehicle of the present disclosure may monitor nested portions of timeseries vibration data (e.g., from a number of high-bandwidth tri-axial accelerometers located on a component of the vehicle, etc.) to identify anomalies in the vibration data associated with a surface characteristic of surface characteristics 20. To continue the previous example, the on-board module may analyze the vibration data using an AI model trained using historical vibration data and/or historical service data (e.g., a record of what components of the vehicle have been serviced and a description of the service performed, etc.) to identify events (e.g., a pattern/characteristic in the vibration data corresponding to vibrations caused by a pothole, etc.) that depart from expected vibration patterns/characteristics associated with traversing a smooth road. To continue the previous example, in response to identifying an event, the on-board module may compare a measure of force and/or wear associated with the event to a threshold. If the amount of force and/or wear exceed the threshold, the on-board module may store the measure of wear in a data structure with a location associated with the identified event. In some embodiments, the on-board module implements the function:

$$\text{IF(flag \&(force>threshold))} \rightarrow \text{Store(wear=}f\text{(vibration data),location)}$$

where flag is generated by an AI model in response to identifying an event, force is generated by applying a transfer function to vibration data, and wear is generated by computing a rainflow matrix using vibration data. In some embodiments, the on-board module generates a prediction of vibration data corresponding to a portion of road, compares the prediction to measured vibration data corresponding to traversing the portion of road, and generates the flag based on the comparison (e.g., if a sufficiently large difference exists between the predicted vibration data and the measured vibration data, etc.).

In some embodiments, the on-board module uses different techniques/models to identify different surface characteristics. For example, the on-board module may use a first AI model to identify potholes (e.g., micro events, etc.) and may use frequency analysis to identify different road textures (e.g., macro events, etc.). For example, the on-board module may compute a Fast-Fourier Transform (FFT) of vibration data and apply a peak-picking filter to identify a frequency signature associated with a specific road texture. In some embodiments, the on-board module and/or the cloud-based data processing system tracks information associated with identified surface characteristics. For example, the on-board module may track (e.g., count, etc.) a number of potholes traversed by a vehicle. As another example, the on-board module may track an amount of time spent traveling on rough surfaces (e.g., off-road, on gravel roads, etc.). In some embodiments, the on-board module and/or the cloud-based data processing system use the tracked information to generate one or more health metrics (e.g., a measurement of vehicle wear, etc.).

In various embodiments, the on-board module and/or cloud-based data processing system generate/update a data structure based on identifying surface characteristics 20. For example, the on-board module may identify a speedbump during traversal of route 100 and may update a database to store a tuple including (i) a measurement of wear calculated based on vibration data associated with traversing the speedbump and (ii) a location (e.g., GPS coordinates, a lane of road 10, etc.). In various embodiments, the on-board module and/or cloud-based data processing system may assess one or more driving routes based on information stored in the data structure. For example, the cloud-based data processing system may analyze a number of candidate routes by computing an objective function for each of the number of candidate routes and may generate a routing recommendation based on comparing an output of the objective function associated with each of the number of candidate routes. In various embodiments, the on-board module and/or the cloud-based data processing system analyze reoccurring routes (e.g., commuting routes, delivery routes, etc.). For example, the cloud-based data processing system may receive a delivery route used by a number of delivery vehicles and may identify a number of alternate routes (e.g., routes associated with less vehicle wear, etc.) that include all of the delivery points of the delivery route but avoid wear-causing sections of the delivery route (e.g., potholes in specific lanes, portions of rough road, etc.).

Figure 1B:
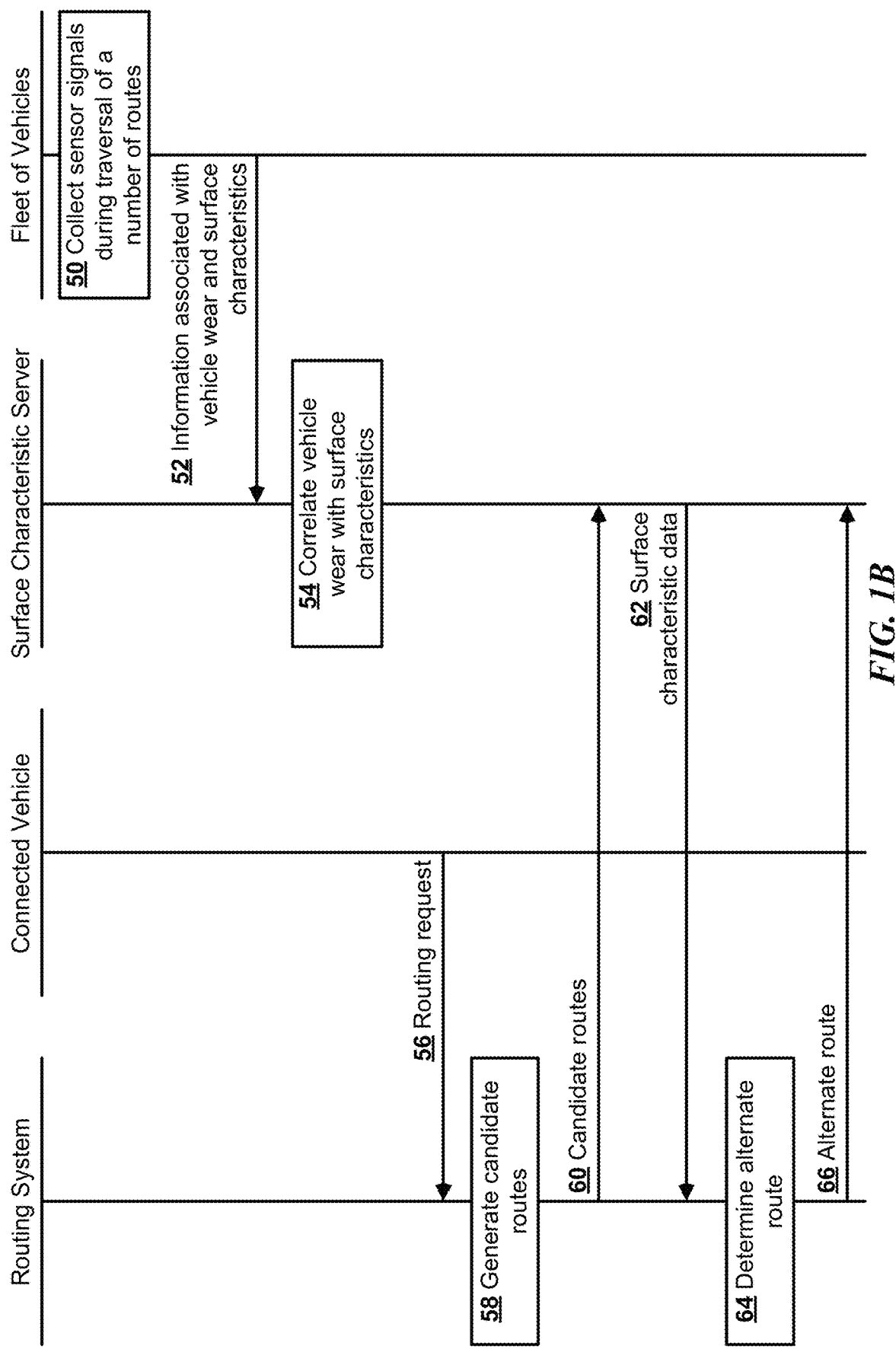
FIG. 1B illustrates an example of identifying an alternate route and displaying the alternate route to a user.

Turning now to FIG. 1B, an example of identifying an alternate route and displaying the alternate route to a user is shown, according to an exemplary embodiment. At step 50, a number of vehicles (e.g., vehicles belonging to a fleet, etc.) may collect sensor signals during traversal of a number of routes. For example, each vehicle may collect vibration data from a number of tri-axial accelerometers and may collect location data from a GPS transceiver. In various embodiments, step 50 includes monitoring wear at each vehicle. For example, each vehicle may continuously monitor wear by computing a rainflow matrix using vibration data. Additionally or alternatively, step 50 may include monitoring surface characteristics at each vehicle. For example, each vehicle may continuously monitor surface characteristics by comparing an amplitude of vibration data to a threshold associated with a surface the vehicle is traveling on. In various embodiments, the sensor signals describe (i) a measure of wear associated with each vehicle, (ii) surface characteristics identified by each vehicle during traversal of a route, and (iii) locations associated with each of the identified surface characteristics. For example, a first vehicle of the fleet of vehicles may collect vibration data and location data and may generate (i) a measure of wear associated with the vehicle and (ii) a map of identified surface characteristics including a measure of wear and a location associated with each identified surface characteristic.

At step 52, each vehicle of the fleet of vehicles may transmit information associated with vehicle wear and surface characteristics to the surface characteristic server. For example, at the end of each day a vehicle may transmit a measure of wear accumulated by the vehicle over the course of the day as well as information associated with a number of surface characteristics identified by the vehicle over the course of the day (e.g., wear associated with each surface characteristic and a location associated with each surface characteristic). In various embodiments, steps 50 and 52 may occur continuously and/or periodically for a period of time (e.g., to build up a library of identified surface characteristics that can be correlated with vehicle wear, etc.).

At step 54, the surface characteristic server may correlate vehicle wear with surface characteristics. For example, the surface characteristic server may correlate historical vehicle wear from wear measurements received from the fleet of vehicles traversing a route over time to a pothole identified on the route to determine that the pothole is causing a specific amount of damage to the vehicles. In various embodiments, step 54 includes analyzing the information received from the fleet of vehicles using an AI model such as a CNN autoencoder. In various embodiments, step 54 includes generating a data structure including a number of identified surface characteristics (e.g., potholes, grade crossings, textures, speedbumps, etc.) and a location associated with each of the identified surface characteristics. For example, step 54 may include generating a map as described below with reference to FIG. 7.

At step 56, a connected vehicle (e.g., an on-board module) may transmit a routing request to a routing system. For example, the connected vehicle may transmit a routing request including an origin (e.g., a current location of the connected vehicle) and a destination. As another example, the connected vehicle may transmit a routing request associated with an existing delivery route. In some embodiments, the routing request includes one or more delivery points. For example, the routing request may include a first warehouse as an origin, a second warehouse as a destination, and a number of residences as delivery points between the origin and the destination.

At step 58, the routing system may generate a number of candidate routes. For example, the routing system may execute a node-routing function to identify a number of candidate routes between an origin and a destination. In a delivery context, the number of candidate routes may include a number of delivery points. In some embodiments, step 58 includes evaluating an objective function associated with a number of routes and selecting a subset of the number of routes as the candidate routes. For example, the routing system may select five routes based on a travel time and distance associated with each route using an objective function (e.g., where the objective function generates a score for each route and the routing system selects the five lowest scoring routes, etc.).

At step 60, the routing system may transmit the candidate routes to a surface characteristic server. In some embodiments, the surface characteristic server maintains a data structure storing surface characteristic information such as a tuple including (i) wear associated with identified surface characteristics and (ii) a location associated with identified surface characteristics. As another example, the surface characteristic server may maintain a map as described in reference to FIG. 7. In some embodiments, the cloud-based data processing system includes the surface characteristic server. In various embodiments, step 60 includes transmitting location information associated with the candidate routes. For example, the routing system may transmit a graph data structure representing the streets and intersections associated with each candidate route. As another example, the routing system may transmit a matrix representing the turns associated with each candidate route.

At step 62, the surface characteristic sever may transmit surface characteristic data associated with each of the candidate routes to the routing system. In some embodiments, step 62 includes transmitting wear measurements associated with the candidate routes. For example, the surface characteristic sever may retrieve each surface characteristic along each of the candidate routes and may transmit the wear measurement stored for each of the surface characteristics. As another example, the surface characteristic server may aggregate the wear associated with each of the surface characteristics associated with each of the candidate routes and may transmit an aggregate measurement of wear associated with each candidate route to the routing system. In various embodiments, the surface characteristic server determines a measurement of wear associated with each candidate route using historical information received from the fleet of vehicles (e.g., steps 50-54). For example, the fleet of vehicles may have previously identified surface characteristics along the candidate routes, and the surface characteristic server may have correlated the identified surface characteristics with accelerated vehicle wear (e.g., tire wear, etc.), and the surface characteristic server may transmit a measure of wear correlated with each of the candidate routes to the routing system based on the previously collected information.

At step 64, the routing system may determine an alternate route. In various embodiments, step 64 includes selecting the alternate route from the candidate routes. For example, the routing system may evaluate an objective function using (i) the distance associated with each candidate route, (ii) the time associated with each candidate route, and (iii) a measure of wear associated with each candidate route to select the alternate route. At step 66, the routing system may transmit the alternate route to the connected vehicle. In various embodiments, step 66 includes causing a display of the connected vehicle to display the alternate route. Additionally or alternatively, step 66 may include transmitting the alternate route to a fleet operator to adjust the operation of a fleet (e.g., adjust a delivery route, etc.).

Figure 2:
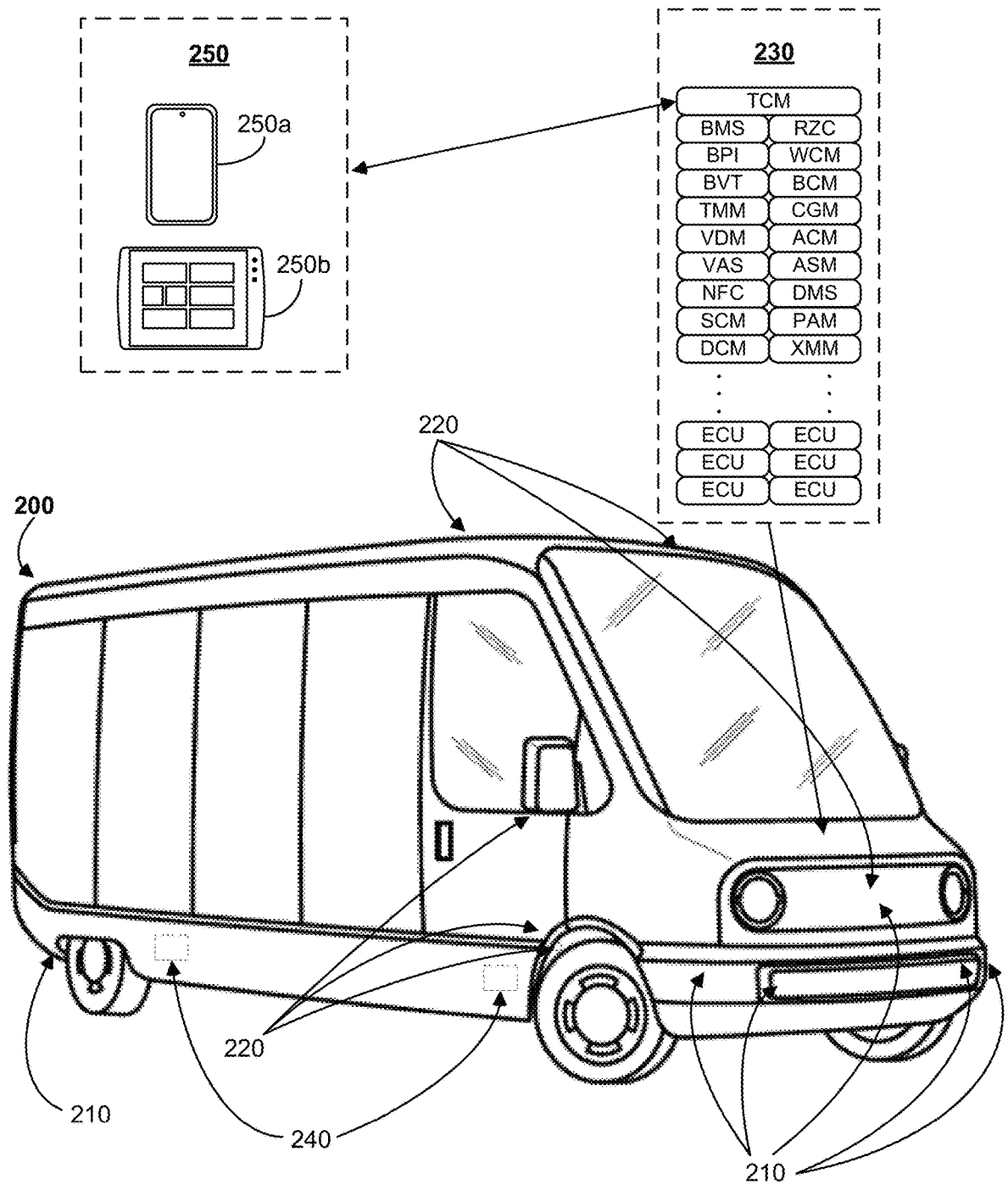
FIG. 2 illustrates an example vehicle with example sensors for measuring vehicle wear and/or surface characteristics along a route.

FIG. 2 illustrates an example vehicle 200 with example sensors for measuring vehicle wear and/or road surface characteristics. In some embodiments, vehicle 200 is a delivery vehicle. Vehicle 200 may include multiple sensors 210, multiple cameras 220, and a control system 230. In some embodiments, vehicle 200 may be able to pair with a computing device 250 (e.g., smartphone 250a, tablet computing device 250b, or a smart vehicle accessory). As an example and not by way of limitation, a sensor 210 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. For example, sensors 210 may include a GPS sensor, a microphone, a steering angle sensor, an ambient temperature sensor, an environmental condition sensor (e.g., detecting rain, snow, fog, etc.), a throttle sensor, a brake pedal apply sensor, an inertial measurement sensor, an accelerometer, a wheel speed sensor, and/or a drive unit speed/torque sensor.

In various embodiments, vehicle 200 includes vibration sensors 240. Vibration sensors 240 may be accelerometers connected to a high bandwidth, bidirectional, digital audio bus on an in-vehicle module. A specific example may be to connect vibration sensors 240 to an A2B-2 bus on the module used for infotainment display and audio. The in-vehicle module may transmit the accelerometer data via a wired connection to a second in-vehicle module which in turn transmits wirelessly to the cloud. Using the previous example, the infotainment module may transmit the accelerometer data via Ethernet to a telematics control module that controls the wireless vehicle communication gateway and over-the-air (OTA) communication between the vehicle and a corresponding cloud. Once the telematics module receives the accelerometer data, it may send that data wirelessly to the cloud.

In various embodiments, vibration sensors 240 are placed in specific portions of vehicle 200. For example, vibration sensors 240 may be placed on the front of vehicle 200 in order to generate an estimate of the accumulated wear on the front component of vehicle 200 and to determine if a crack may be present on the component. In various embodiments, vibration sensors 240 may be used to monitor road surface characteristics. For example, an on-board module may receive vibration data from vibration sensors 240 and may identify surface characteristics (e.g., potholes, grade crossings, etc.) based on the vibration data (e.g., by performing frequency analysis, by applying an AI model, etc.). A number of techniques may be applied to the signal data from vibration sensors 240 to estimate the vibrations that are accumulating on the vehicle components (e.g., tires, struts, drive unit gears, etc.) and/or estimate road surface characteristics. In various embodiments, the estimate of accumulated vibrations may correlate with a route to determine an amount of wear caused by the route (e.g., on vehicle 200 or components thereof, etc.). In various embodiments, vibration sensors 240 are positioned in a first location on vehicle 200 and are used to measure vibrations associated with a component at a second location on vehicle 200 remote from the first location. For example, a vibration sensor 240 may be positioned on a component of vehicle 200 and may generate a measurement of vibrations at a wheel of vehicle 200 using a transfer function. Analysis of signal data is described in greater detail below.

As an example and not by way of limitation, a camera 220 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 200 may include various controllable components (e.g., doors, seats, windows, lights, HVAC, entertainment system, security system), instrument and information displays and/or interactive interfaces, functionality to pair a computing device 250 with the vehicle (which may enable control of certain vehicle functions using the computing device 250), and functionality to pair accessories with the vehicle, which may then be controllable through an interactive interface in the vehicle or through a paired computing device 250. In some embodiments, vehicle 200 includes one or more cameras 220 positioned in a wheel-well of vehicle 200. For example, vehicle 200 may include a number of cameras positioned in a wheel-well to monitor a tire of vehicle 200 to generate an estimate of tire wear (e.g., determine a tread depth from image data, etc.). In some embodiments, vehicle 200 includes one or more cameras 220 to monitor road surface characteristics. For example, vehicle 200 may include a camera 220 that captures images of a road surface and identifies road surface characteristics (e.g., potholes, raveling, etc.) using image analysis. In various embodiments, data from sensors 210, cameras 220, and/or vibration sensors 240 is anonymized to protect operator privacy. For example, the data may prefiltered/preprocessed to remove any personally identifying information (e.g., in-vehicle conversations, a home address, etc.). As another example, sensors 210 may only become active once vehicle 200 is traveling above 20 miles-per-hour.

Control system 230 may enable control of various systems on-board the vehicle. As shown in FIG. 2, control system 230 may comprise one or more electronic control units (ECUs), each of which are dedicated to a specific set of functions. Each ECU may be a computer system (as described further in FIGS. 13A and 13B), and each ECU may include functionality provide by one or more of the example ECUs described below.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 250, in-vehicle navigation, vehicle-to-vehicle communication, communication between the vehicle and landscape features (e.g., automated toll road sensors, automated toll gates, power dispensers at charging stations), or automated calling functionality. In various embodiments, the TCM ECU transmits information associated with a health of vehicle 200 and/or components of vehicle 200. For example, the TCM ECU may transmit raw sensor data from vibrations sensors 240 to a cloud processing system such as the surface characteristic server described with reference to FIG. 1B. As another example, the TCM ECU may transmit a measurement of temporal wear (e.g., a number of fatigue cycles accumulated over 15 minutes of operation, etc.) associated with a vehicle component to a vehicle data analysis system. In some embodiments, the TCM ECU transmits additional information associated with operation of vehicle 200. For example, the TCM ECU may transmit a location associated with a road characteristic identified by vehicle 200. As another example, the TCM ECU may transmit one or more driving characteristics (e.g., average following distance, percentage of time over the speed limit, etc.) associated with a driving pattern of a user of vehicle 200. In various embodiments, the TCM ECU computes additional information such as component wear based on received signals from sensors such as sensors 210 and/or vibration sensors 240. For example, the TCM ECU may include a diagnostics feature to compute wear associated with a vehicle component using a rainflow matrix.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s). In various embodiments, the CGM ECU collects sensor signals from one or more sensors of vehicle 200. For example, the CGM ECU may collect vibration signals from vibration sensors 240 for transmittal to a remote processing system via the TCM ECU. As another example, the CGM ECU may collect information about a road surface vehicle 200 travels on. For example, the CGM ECU may collect vibration signals associated with traversing a route and may associate location data (e.g., a GPS position, etc.) with the vibration signals. In various embodiments, the CGM ECU collects signals associated with a user's operation of vehicle 200. For example, the CGM ECU may record any hard stopping events, the following distance of vehicle 200 behind other vehicles, measurements of torque on a component of vehicle 200 based on hard-cornering events, and/or the like.

Vehicle 200 may include one or more additional ECUs, such as, by way of example and not limitation: a Vehicle Dynamics Module (VDM) ECU, an Experience Management Module (XMM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 200 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU. In various embodiments, the XMM ECU transmits data from vibration sensors 240 to the TCM ECU (e.g., via Ethernet, etc.). Additionally or alternatively, the XMM ECU may transmit other data (e.g., sound data from a number of microphones, etc.) to the TCM ECU.

Figure 3:
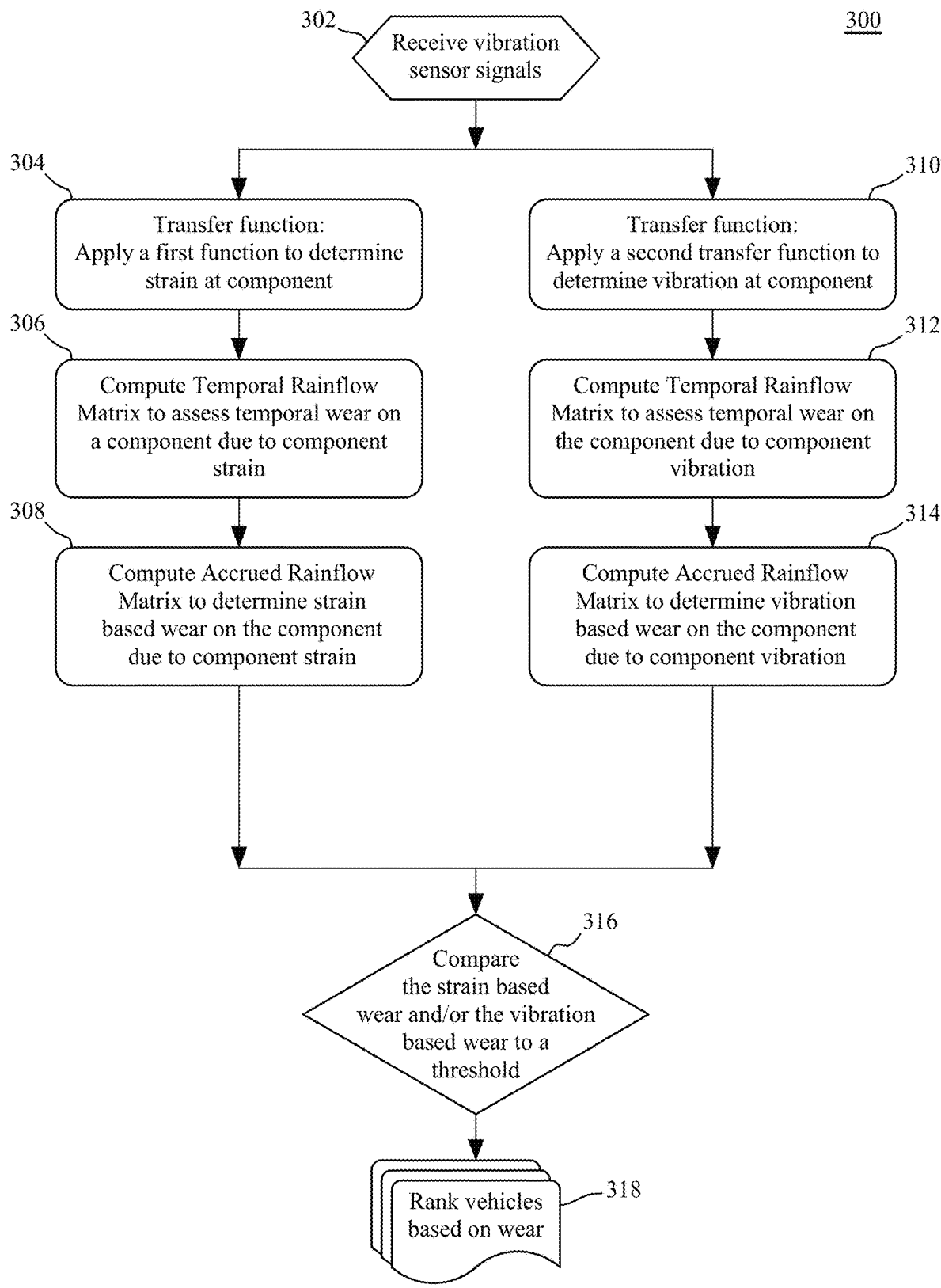
FIG. 3 is a flowchart illustrating a method of computing wear for a vehicle and ranking a number of vehicles based on wear.

Referring now to FIG. 3, a flowchart illustrating method 300 of computing wear for a vehicle and ranking a number of vehicles based on wear is shown, according to an exemplary embodiment. In various embodiments, vehicle 200 performs one or more steps of method 300. Additionally or alternatively, one or more external systems, such as a cloud-based data processing system, may perform one or more steps of method 300. For example, vehicle 200 may compute (e.g., via the TCM ECU of control system 230, etc.) wear associated with vehicle 200 and a vehicle data analysis system may rank a number of vehicles based on the computed wear associated with each vehicle.

The strain-based wear and vibration-based wear accumulating on the component may be computed separately but in parallel. In both cases, a transfer function may be applied first to the incoming vibration sensor signals. A temporal rainflow matrix may be integrated into a constantly updating accrual rainflow matrix which is used to compute the final wear amounts. The wear may be compared against a threshold and a component having accumulated wear that exceeds the acceptable threshold may be identified for servicing.

At step 302, control system 230 may receive vibration sensor signals. For example, control system 230 may receive vibration sensor signals from vibration sensors 240 positioned on specific portions of vehicle 200. In various embodiments, the vibration sensor signals include timeseries data. At step 304, control system 230 may apply a first transfer function to determine strain at a component of vehicle 200. For example, control system 230 may retrieve a transfer function corresponding to a specific vibration sensor 240 and component pair from a lookup table and may apply the transfer function to signals from the specific vibration sensor 240 to determine strain at the component.

Speaking generally, control system 230 may utilize one or more transfer functions that model a characteristic of vehicle 200 at a second location based on a characteristic of vehicle 200 at a first location. For example, control system 230 may utilize a first transfer function that models force on a portion of a component of vehicle 200 based on a measurement of vibrations at a wheel of vehicle 200. As another example, control system 230 may utilize a second transfer function that models vibration at a wheel strut based on a measurement of vibrations at a component of vehicle 200. In various embodiments, the one or more transfer functions are determined based on operational measurements (e.g., measurements describing a relationship between vibration and strain, etc.).

In various embodiments, determining strain includes computing a measurement of vibration at the component based on the vibration sensor signals. Additionally or alternatively, determining strain may include computing a measurement of force at the component based on the vibration sensor signals. For example, control system 230 may compute a measurement of vibration at a location on a component of vehicle 200 by applying a first transfer function to sensor signals from a vibration sensor positioned on a wheel of vehicle 200 and may compute a measurement of force at the location on the component by applying a second transfer function to the measurement of vibration at the location.

At step 306, control system 230 may compute a temporal rainflow matrix to assess temporal wear on a component due to component strain. For example, control system 230 may compute a number of fatigue cycles associated with a spring damper based on timeseries data describing force on the spring damper. In various embodiments, the temporal rainflow matrix is associated with a time period. For example, the temporal rainflow matrix may represent an accumulation of fatigue cycles associated with a component over a 24-hour period. It should be understood that a different period may be used (e.g., 15 seconds, 1 hour, whenever connected to the Internet, etc.). In various embodiments, the temporal rainflow matrix is an assembly of a number of fatigue cycles, an amplitude associated with the fatigue cycles, and/or a frequency of the fatigue cycles.

At step 308, control system 230 may compute an accrued rainflow matrix to determine strain-based wear on the component due to component strain. For example, control system 230 may compute an accrued number of fatigue cycles associated with a component of vehicle 200 over a lifetime of the component. In some embodiments, step 308 includes querying an external system, such as a vehicle data analysis system, to retrieve a first measurement of fatigue cycles associated with a first time period and adding a second measurement of fatigue cycles associated with a second time period to determine the strain-based wear. Additionally or alternatively, vehicle 200 may store a running count of fatigue cycles associated with one or more components. In various embodiments, the strain-based wear includes an aggregate number of fatigue cycles and an amplitude associated with the fatigue cycles corresponding to the component. In some embodiments, control system 230 compares the aggregate number of fatigue cycles and the amplitude associated with the fatigue cycles to a value associated with component failure to determine a percentage of lifetime remaining associated with the component. In some embodiments, the value associated with component failure is determined experimentally (e.g., via coupon testing, etc.).

At step 310, control system 230 may apply a second transfer function to determine vibrations at the component. For example, control system 230 may retrieve a transfer function corresponding to a specific vibration sensor 240 and component pair from a lookup table and may apply the transfer function to signals from the specific vibration sensor 240 to determine vibrations at the component. At step 312, control system 230 may compute a temporal rainflow matrix to assess temporal wear on the component due to component vibration. For example, control system 230 may compute a number of fatigue cycles associated with the component and an amplitude of the fatigue cycles based on the vibration at the component.

At step 314, control system 230 may compute an accrued rainflow matrix to determine vibration-based wear on the component due to component vibration. For example, control system 230 may sum a number of fatigue cycles associated with a component that were accumulated over a 24-hour period with a number of fatigue cycles associated with the component accumulated before the 24-hour period. In embodiments where vehicle 200 is an electric vehicle, step 316 may occur in response to control system 230 sensing that vehicle 200 has been connected to a charger. In some embodiments, control system 230 compares the aggregate number of fatigue cycles and the amplitude associated with the fatigue cycles to a value associated with component failure to determine a percentage of lifetime remaining associated with the component.

At step 316, control system 230 may compare the strain-based wear to a threshold. For example, control system 230 may compare an aggregate number of fatigue cycles associated with the component over the lifetime of the component to a threshold to determine whether the aggregate number of fatigue cycles exceed the threshold. Additionally or alternatively, control system 230 may compare the vibration-based wear to a threshold. In various embodiments, control system 230 uses a first threshold for comparing strain-based wear and a second threshold for comparing vibration-based wear. In various embodiments, if the vibration-based wear and/or strain-based wear exceeds the threshold, control system 230 generates an alert. The alert may trigger additional actions such as automatically scheduling a service appointment to service the component. In some embodiments, the first and second thresholds are determined experimentally (e.g., via coupon testing, etc.). Additionally or alternatively, the first and second thresholds may be determined using an AI model trained with historical service data.

At step 318, a vehicle data analysis system may rank vehicles based on wear. For example, the vehicle data analysis system may query a ledger containing one or more vehicle health metrics associated with a fleet of vehicles and may rank the vehicles in the fleet from most wear to least wear. In some embodiments, step 318 includes aggregating one or more wear metrics associated with a number of components of a vehicle into a single wear metric representing the overall vehicle. For example, a vehicle data analysis system may track wear associated with 100 vehicle components of a vehicle and may generate an average wear metric for the vehicle by computing an average of the 100 component wear metrics. In various embodiments, the vehicle data analysis system ranks the vehicles based on the average wear metric. Additionally or alternatively, the vehicle data analysis system may rank the vehicles based on individual component wear metrics.

In a delivery vehicle context, the ranking of vehicles may be used to determine which vehicles to assign to which delivery routes (e.g., in a situation where an alternate route having a lower level of associated wear is not feasible, etc.). For example, a first delivery route may be associated with a first amount of wear, a second delivery route may be associated with a second amount of wear that is greater than the first amount of wear, and a cloud-based data processing system may assign a first vehicle having a first amount of accumulated wear to the first delivery route and may assign a second delivery vehicle having a second amount of accumulated wear that is less than the first amount of accumulated wear to the second delivery route, thereby slowing the accumulation of wear and extending the lifetime of the first delivery vehicle. In various embodiments, the ranking enables a fleet manager to determine a maintenance schedule for the fleet. For example, the fleet manager may prioritize vehicles having a high wear ranking. In various embodiments, the ranking is used to identify/prioritize routes in need of alteration. For example, a vehicle data analysis system may determine that the top ten vehicles in the ranking (e.g., the vehicles having the highest levels of wear, the vehicles experiencing the most accelerated wear, etc.) are all associated with a particular delivery route and in response may prioritize identifying an alternate route for the particular delivery route (e.g., to utilize compute resources on the most impactful routing analysis first, etc.).

Figure 4:
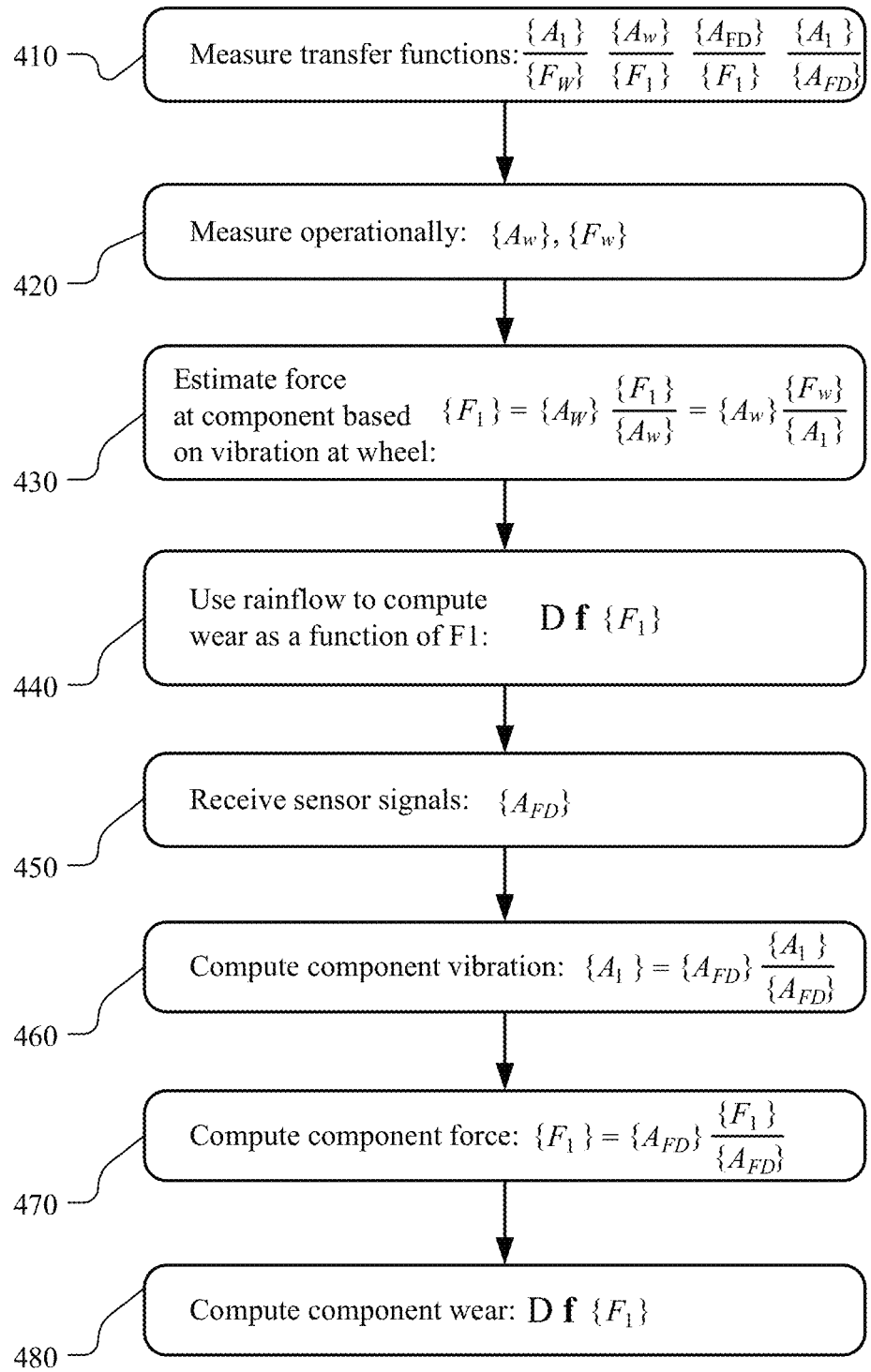
FIG. 4 illustrates a method of computing component wear for a vehicle.

FIG. 4 illustrates a method 400 of computing component wear for a vehicle, according to an exemplary embodiment. Method 400 may be used to perform background monitoring of a component of vehicle 200. A vibration sensor may be coupled to the component. An output of a first vibration sensor may be represented by $\{A_{FD}\}$. An output of a second vibration sensor 406 may be represented by $\{A_W\}$. In some embodiments, a force corresponding to a wheel is calculated based on the output a vibration sensor. The force corresponding to the wheel may be represented by $\{F_W\}$. The vibration sensors may be used to monitor a portion of a component for wear. For example, method 400 may be used to identify a crack at a portion of a component. The force and vibration at the portion of the component may be represented as $\{F_1\}$ and $\{A_1\}$ respectively.

At step 410, one or more transfer functions may be measured. A transfer function may describe a relationship between vibration at a first location (e.g., the location of a first vibration sensor, etc.) and vibration at a second location (e.g., the location of the portion of the component, etc.). However it should be understood that transfer functions representing other relationships are possible. For example, a transfer function may describe a relationship between vibration at a first location and force at a second location. The one or more transfer functions may be represented as:

$$\frac{\{A_1\}}{\{A_W\}} \frac{\{A_W\}}{\{F_1\}} \frac{\{A_{FD}\}}{\{F_1\}} \frac{\{A_1\}}{\{A_{FD}\}}$$

At step 420, an output of a vibration sensor may be measured. In some embodiments, step 420 includes calculating a force at a wheel based on vibration measurements at the wheel. At step 430, an estimate of force at a portion of a component may be estimated based on vibration at the wheel. For example, control system 230 may compute an estimate of force at a portion of a component by applying a transfer function to vibration data from a vibration sensor. In some embodiments, an output of step 430 includes timeseries force data corresponding to force experienced by the portion of the component over time. In various embodiments, step 430 includes implementing the function:

$$\{F_1\} = \{A_W\}\frac{\{F_1\}}{\{A_W\}} = \{A_W\}\frac{\{F_W\}}{\{A_1\}}$$

At step 440, control system 230 may compute wear associated with the portion of the component using the force computed in step 430. In various embodiments, step 440 includes calculating a rainflow matrix based on the force. For example, control system 230 may sum a number of fatigue cycles generated from timeseries force data. In some embodiments, wear is expressed as a percentage of a threshold number of fatigue cycles. In various embodiments, control system 230 performs steps 440-480. At step 450, control system 230 may receive vibration data from a vibration sensor. At step 460, control system 230 may compute component vibration using the vibration data from the vibration sensor. In various embodiments, step 460 includes applying a transfer function to the vibration data from the vibration sensor. For example, control system 230 may implement the function:

$$\{A_1\} = \{A_{FD}\}\frac{\{A_1\}}{\{A_{FD}\}}$$

At step 470, control system 230 may compute component force for the portion of the component using the vibration data from the vibration sensors. In various embodiments, step 470 includes applying a transfer function to the vibration data from a vibration sensor. For example, control system 230 may implement the function:

$$\{F_1\} = \{A_{FD}\}\frac{\{F_1\}}{\{A_{FD}\}}$$

At step 480, control system 230 may compute component wear based on the component force computed in step 470. In various embodiments, step 480 includes calculating a rainflow matrix based on the force. For example, control system 230 may sum a number of fatigue cycles generated from timeseries force data. In some embodiments, wear is expressed as a percentage of a threshold number of fatigue cycles. In some embodiments, step 480 includes combining the measure of wear associated with the portion of the component generated from vibration data from a first vibration sensor with the measure of wear associated with the portion of the component generated from vibration data from a second vibration sensor. For example, control system 230 may compute an average wear using the two measurements of wear. In some embodiments, steps 420-440 are performed in parallel with steps 450-480.

Figure 5:
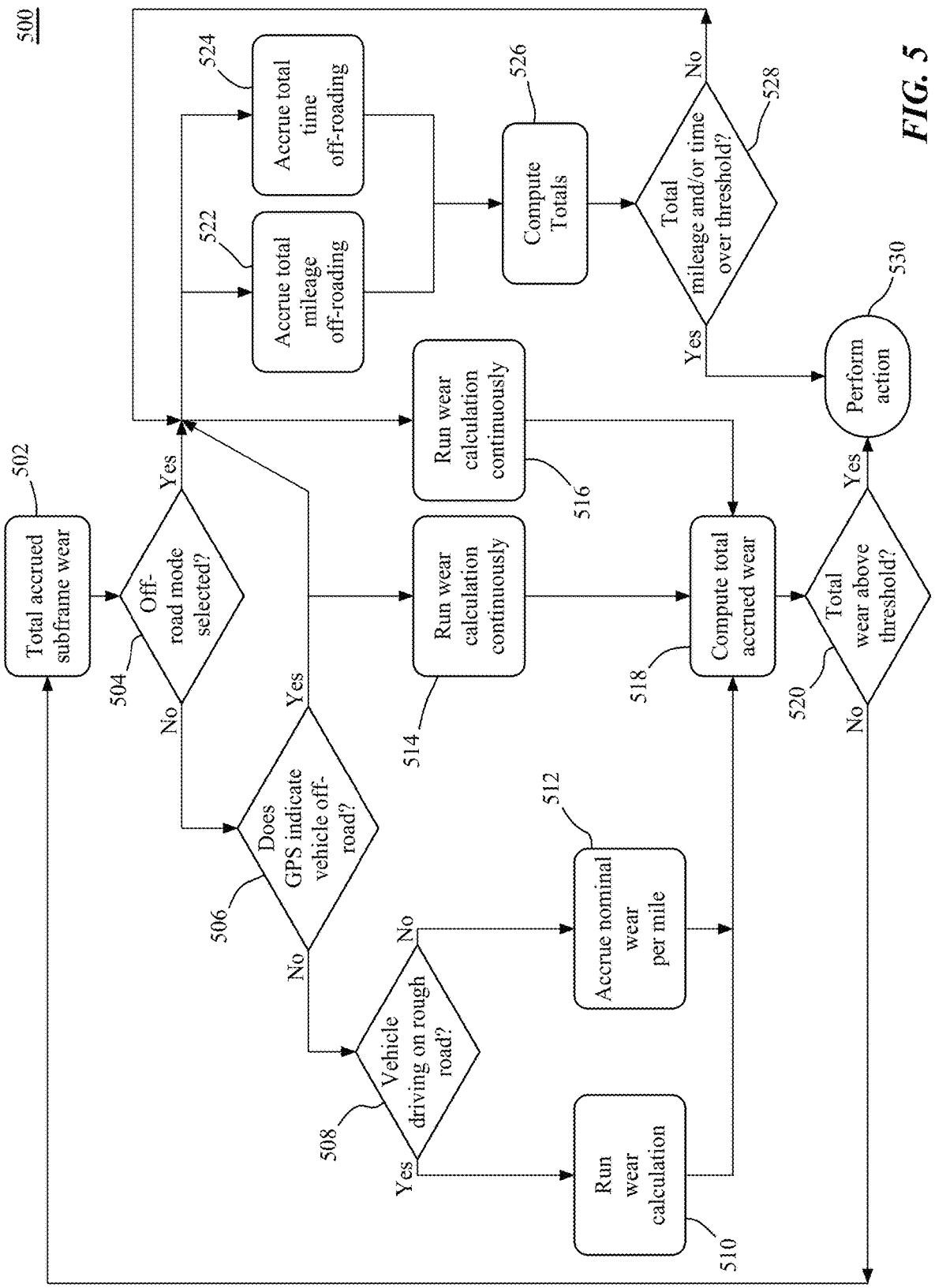
FIG. 5 is a flowchart illustrating a method of monitoring wear for a vehicle.

FIG. 5 is a flowchart illustrating a method 500 of monitoring wear for a vehicle. For example, control system 230 may implement method 500 to continuously monitor wear associated with one or more components of vehicle 200. Starting with the total accrued component wear calculated from the above description, a determination may be made to determine whether the vehicle is currently in an off-road environment. Using the off-road mode of the vehicle as an initial indicator, a vehicle in this mode may result in both a wear calculation and an off-road mileage and time calculation. These accrued totals may then be compared against thresholds representing acceptable threshold values and exceeding either threshold may result in the trigger of a diagnostic trouble code (DTC) to notify the customer of a potential problem and a need for service. On the other hand, if the off-road mode of the vehicle is not enabled, the vehicle's GPS may be utilized to determine the road conditions the vehicle is currently subjected to. Indications of off-road conditions may result in actual wear calculations, whereas only nominal wear calculations are performed otherwise. In both conditions, the computed total wear is subsequently compared against the threshold and may also in turn result in the trigger of a DTC.

At step 504, control system 230 may determine whether an off-road mode is selected. For example, the TCM ECU may query the CGM ECU to determine what mode vehicle 200 is in. If the off-road mode is selected (yes), method 500 may continue with steps 516, 522, and 524. At step 516, control system 230 may run wear calculations continuously. For example, control system 230 may execute a method of monitoring component wear as described in detail above. At step 518, control system 230 may compute total accrued wear based on the wear calculation from step 516. For example, control system 230 may compute a rainflow matrix representing a total number of accrued fatigue cycles associated with a vehicle and/or a vehicle component over its lifetime. At step 520, control system 230 may compare the total accrued wear from step 518 with a threshold. If the total accrued wear is less than the threshold (no), then control system 230 may save the total accrued component wear (step 502). If the total accrued wear is greater than the threshold (yes), then control system 230 may perform an action (step 530). The action may include automatically scheduling a service appointment to service a component determined to have exceeded a threshold level of wear. Additionally or alternatively, the action may include alerting service personnel that the vehicle requires service.

At step 522, control system 230 may accrue total mileage off-roading. For example, control system 230 may update a counter to determine the number of miles driven in the off-road mode. At step 524, control system 230 may accrue total time off-roading. For example, control system 230 may update a timer to determine the total time spent in the off-road mode. At step 526, control system 230 may compute totals. For example, control system 230 may compute a total amount of mileage driven off-road and/or a total amount of time spent off-roading. At step 528, control system 230 may compare the total mileage and/or the total time to a threshold. In some embodiments, control system 230 compares the total mileage to a first threshold and the total time to a second threshold. If the total mileage and/or the total time are greater than a threshold (yes), then control system 230 may perform an action (step 530). For example, control system 230 may alert a user that a service appointment is recommended based on the total number of miles driven off-road. If the total mileage and/or total time are less than a threshold (no), then control system 230 may continue monitoring wear, mileage, and/or time associated with off-roading.

If the off-road mode is not selected (no), method 500 may continue with step 506. At step 506, control system 230 may determine whether GPS data indicates the vehicle is off-road. For example, control system 230 may compare a GPS location of vehicle 200 to a map of known roads to determine whether vehicle 200 is on one of the known roads. If the GPS data indicates that the vehicle is off-road (yes), then control system 230 may perform the off-road monitoring described above (e.g., steps 516, 522, and 524). If the GPS data indicates that the vehicle is not off-road (no), then control system 230 may determine whether the vehicle is driving on a rough road (step 508). For example, control system 230 may compare an amplitude of vibration data signals to a threshold and determine that the vehicle is driving on a rough road if the amplitude of the vibration data signals exceed the threshold a threshold number of times during a period.

If control system 230 determines that the vehicle is driving on a rough road (yes), then control system 230 may run a wear calculation continuously (step 510). Running the wear calculation may include computing a rainflow matrix to determine an aggregate number of fatigue cycles based on vibration data as described in detail above. If control system 230 determines that the vehicle is not driving on a rough road (no), then the control system may accrue nominal wear per mile (step 512). For example, control system 230 may add a scalar value to a rainflow matrix for each mile traveled by the vehicle. In various embodiments, control system 230 performs step 518 after steps 510 and 512.

In some embodiments, assessments of wear as described herein may be directed to vehicle control systems, methods, and computer readable mediums for assessing vehicle operators and generating recommendations to mitigate wear on a vehicle. The systems and methods of the present disclosure can monitor wear on a vehicle and correlate the wear to driving patterns of an operator to generate recommendations to adjust operator behavior, thereby reducing vehicle wear, vehicle downtime, and maintenance costs. Further description related to such embodiments is disclosed in U.S. Nonprovisional application Ser. No. 17/959,158, filed Oct. 3, 2022, "Driver Scoring Platform," which is incorporated herein by reference.

Figure 6:
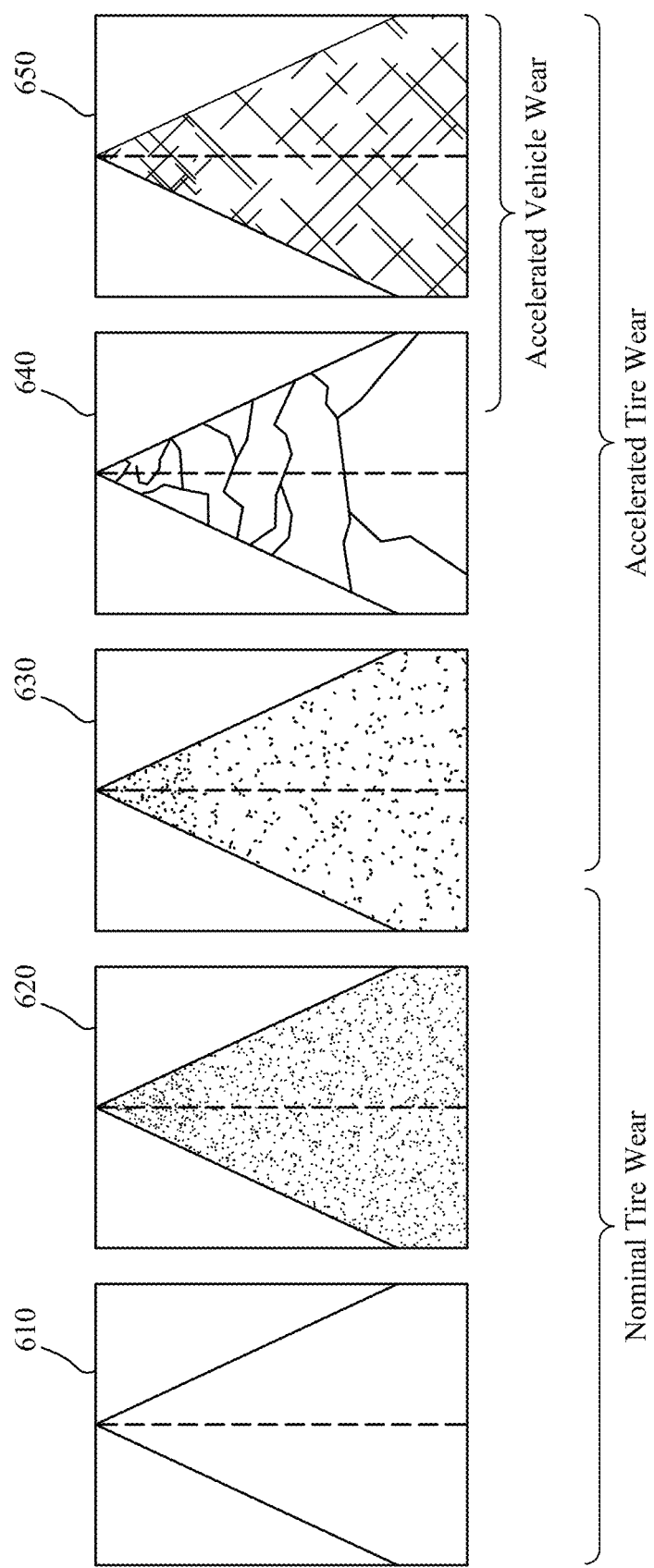
FIG. 6 illustrates an example of a number of road surfaces that produce different amounts of wear.

Turning now to FIG. 6, an example of a number of road surfaces that produce different amounts of wear is shown, according to an exemplary embodiment. In various embodiments, different road surfaces cause different amounts of wear on a vehicle/vehicle component. For example, a road having a number of potholes may cause mechanical wear to a suspension system of a vehicle faster than a road without the number of potholes. As another example, a road that produces high-amplitude vibrations (e.g., a rough road, etc.) may cause more wear than a road that produces low-amplitude vibrations (e.g., a comparatively smooth road, etc.). In various embodiments, road surfaces 610-650 represent variations in road surface characteristics with road surface 610 being the smoothest road and road surface 650 being the roughest road (e.g., where road surfaces 610-650 represent a gradient of least wear-causing to most wear-causing road surfaces, etc.). For example, road surface 610 may be a smooth road devoid of any potholes, cracks, raveling, and/or the like, while road surface 650 may be a rough road (e.g., having a rough texture such as a gravel road, etc.) having many large potholes, cracks, extreme raveling, and the like. In various embodiments, different road surfaces 610-650 cause differential wear to specific components of a vehicle. For example, a road having a rough texture but few potholes (e.g., road surface 630, etc.) may cause accelerated wear to tires of a vehicle without causing accelerated wear to other components of the vehicle (e.g., the component, suspension, etc.).

In various embodiments, systems and methods of the present disclosure differentiate between road surfaces 610-650. For example, an on-board module may analyze vibration data using frequency analysis to identify a texture of a road surface and may classify the road as one of road surfaces 610-650 based on the identified texture. As another example, the on-board module may analyze image data using an AI model to identify surface characteristics such as potholes and cracks and may classify the road as one of road surfaces 610-650 based on the identified surface characteristics. In various embodiments, systems and methods of the present disclosure facilitate generating a data structure storing classified road surfaces. For example, a cloud-based data processing system may generate a map of roads in an area and may label each road as one of road surfaces 610-650 based on information received from vehicles that traverse the roads.

Figure 7:
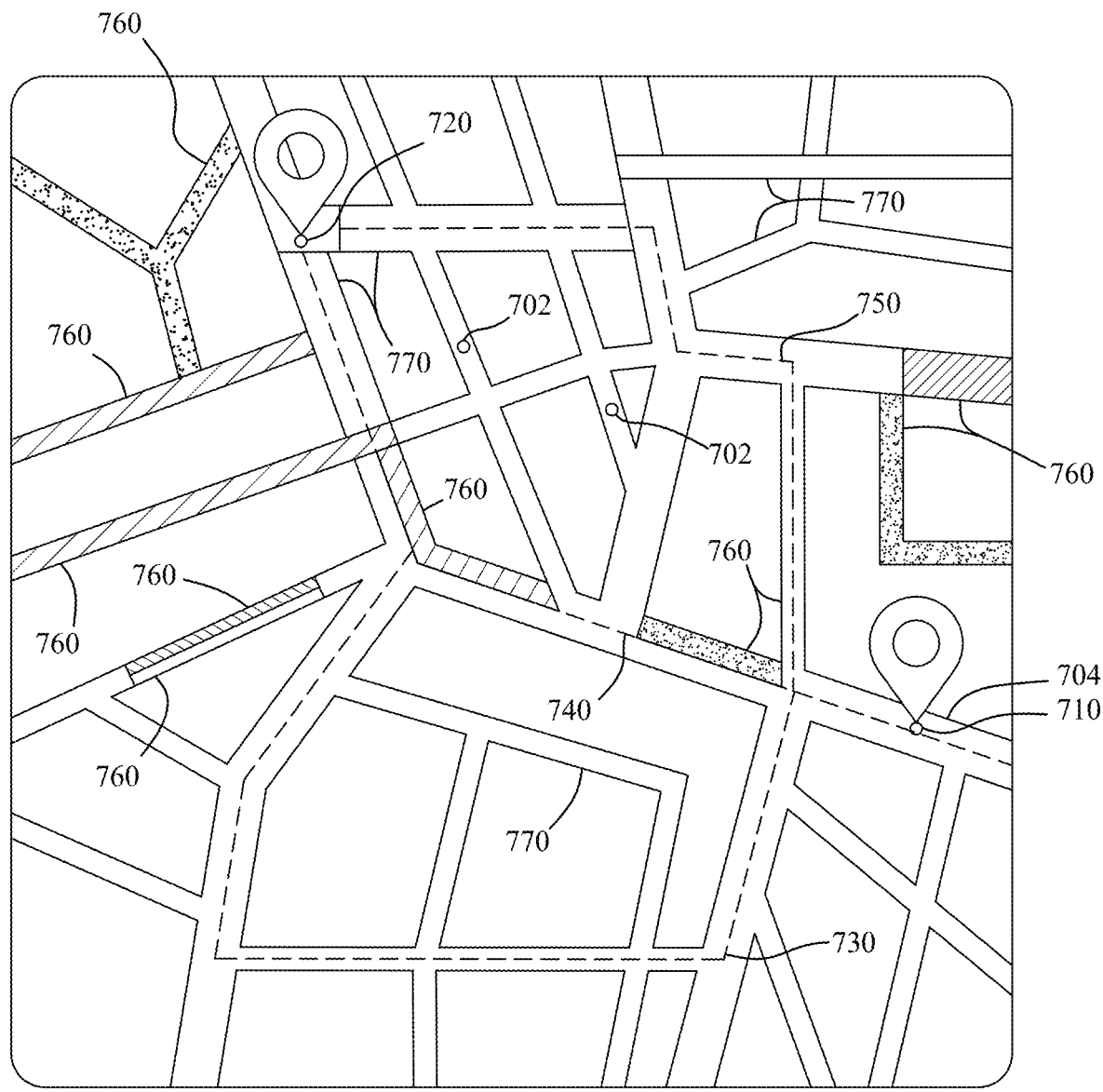
FIG. 7 illustrates an example of a map having classified road surfaces.

Turning now to FIG. 7, an example of map 700 having classified road surfaces is shown, according to an exemplary embodiment. In various embodiments, an on-board module and/or a cloud-based data processing system generate map 700. It should be understood that while map 700 is represented as a map, the on-board module and/or the cloud-based data processing system may represent/store road surface characteristics using any data structure and the embodiment of a map is non-limiting and used for illustrative purposes only. In various embodiments, map 700 includes origin 710 and destination 720. In various embodiments, routes 730-750 connect origin 710 and destination 720. For example, a delivery vehicle may traverse route 740 to deliver a package at destination 720. In various embodiments, map 700 includes roads 704. Roads 704 may include surface characteristics 702. Surface characteristics 702 may include potholes, cracks, raveling, speedbumps, grade crossings, manhole covers, bumps, texture, curbs, and/or the like. Additionally or alternatively, surface characteristics 702 may include any road surface characteristic capable of causing wear to a vehicle. For example, surface characteristics 702 may include the lip of a roundabout. In some embodiments, surface characteristics 702 include transient elements such as debris, snow buildup, and/or the like. In various embodiments, each of surface characteristics 702 is associated with a measure of wear. For example, surface characteristics 702 may be represented using a data structure including (i) a location, (ii) a measure of wear, and/or (iii) a classification (e.g., pothole, speed bump, texture, etc.). Additionally or alternatively, surface characteristics 702 may be classified as micro and macro events. For example, the on-board module may classify a speed bump as a micro event and may save a discrete location associated with the speed bump and may classify a rough road texture as a macro event and may save a portion of road 704 associated with the rough road texture.

In various embodiments, the on-board module and/or the cloud-based data processing system identify surface characteristics 702 based on analysis of sensor signals from vehicles traversing roads 704. For example, a number of vehicles may collect vibration data while traversing roads 704 and the cloud-based data processing system may analyze the vibration data to identify portions of road 704 where a vehicle traversed a pothole and may save the location to map 700. In various embodiments, the on-board module and/or the cloud-based data processing system classify surface characteristics 702 to generate classified road surfaces 760. In various embodiments, classified road surfaces 760 may represent road surfaces 610-650. In various embodiments, classified road surfaces 760 may represent an amount of wear (e.g., vehicle-based wear, component-based wear, etc.) associated with traversing a particular portion of road 704 (e.g., a specific lane, a road, etc.). For example, as shown on the left side of map 700, one lane of road 704 may have a first classification (represented using crosshatching) associated with a first amount of wear and another lane of road 740 may have a second classification (represented with no fill) associated with a second amount of wear that is less than the first amount of wear. In some embodiments, map 700 includes unclassified road surfaces 770. For example, map 700 may include a number of roads 704 that a vehicle has not yet traversed, therefore there isn't any information to generate a road classification with. Additionally or alternatively, unclassified road surfaces 770 may correspond to portions of road 704 for which insufficient data exists (e.g., only a single vehicle has traversed the portion, etc.). In some embodiments, identifying surface characteristics 702 includes combining sensor signals from a number of sensors. For example, the on-board module may combine vibration data with an acoustic signature from microphone data to identify rain. As another example, the on-board module may combine a coefficient of friction (e.g., from a wheel speed/torque sensor, etc.) with vibration data to identify snow. In some embodiments, the on-board module uses different techniques and/or models depending on a surface the vehicle is traversing. For example, the on-board module may use a first model when traversing a smooth road and may use a second model when traversing a cobblestone road. In some embodiments, identifying surface characteristics 702 includes performing a first type of analysis using a first processing system (e.g., the on-board module, etc.) and performing a second type of analysis using a second processing system (e.g., the cloud-based data processing system, etc.). For example, the on-board module may execute a physics model in parallel with the cloud-based data processing system executing an AI model to identify the surface characteristics.

In various embodiments, the on-board module and/or the cloud-based data processing system analyze a number of routes to generate a routing recommendation. For example, the cloud-based data processing system may analyze routes 730 and 750 as an alternative to route 740 to determine whether route 730 and/or route 750 produce less wear on a vehicle than route 740. In various embodiments, analyzing the number of routes includes aggregating an amount of wear associated with each candidate route by identifying each surface characteristic 702 along the route and summing a measure of wear associated with each of the identified surface characteristics 702. For example, the cloud-based data processing system may implement the function:

$$\text{Aggregate wear} = \sum_{i=1}^{i=n} w_i$$

where $w_i$ is a measure of wear associated with surface characteristic i and n is the number of surface characteristics along a route.

In various embodiments, the on-board module and/or the cloud-based data processing system generate a routing recommendation based on the aggregate wear associated with each of the candidate routes (e.g. by selecting the candidate route producing the least wear, etc.). In some embodiments, the on-board module and/or the cloud-based data processing system may select one of unclassified road surfaces 770 for the route rather than use a classified road surface known to be associated with causing a large amount of wear on a vehicle.

In some embodiments, the on-board module and/or the cloud-based data processing system display the routing recommendation to a user. In some embodiments, the routing recommendation includes a measure of wear. In various embodiments, a vehicle may display map 700 to a user to facilitate visualizing different routes. For example, wear information from map 700 may be integrated into a navigation UI (e.g., as a heatmap illustrating the degree of wear caused by different portions of road 704, etc.).

Figure 8:
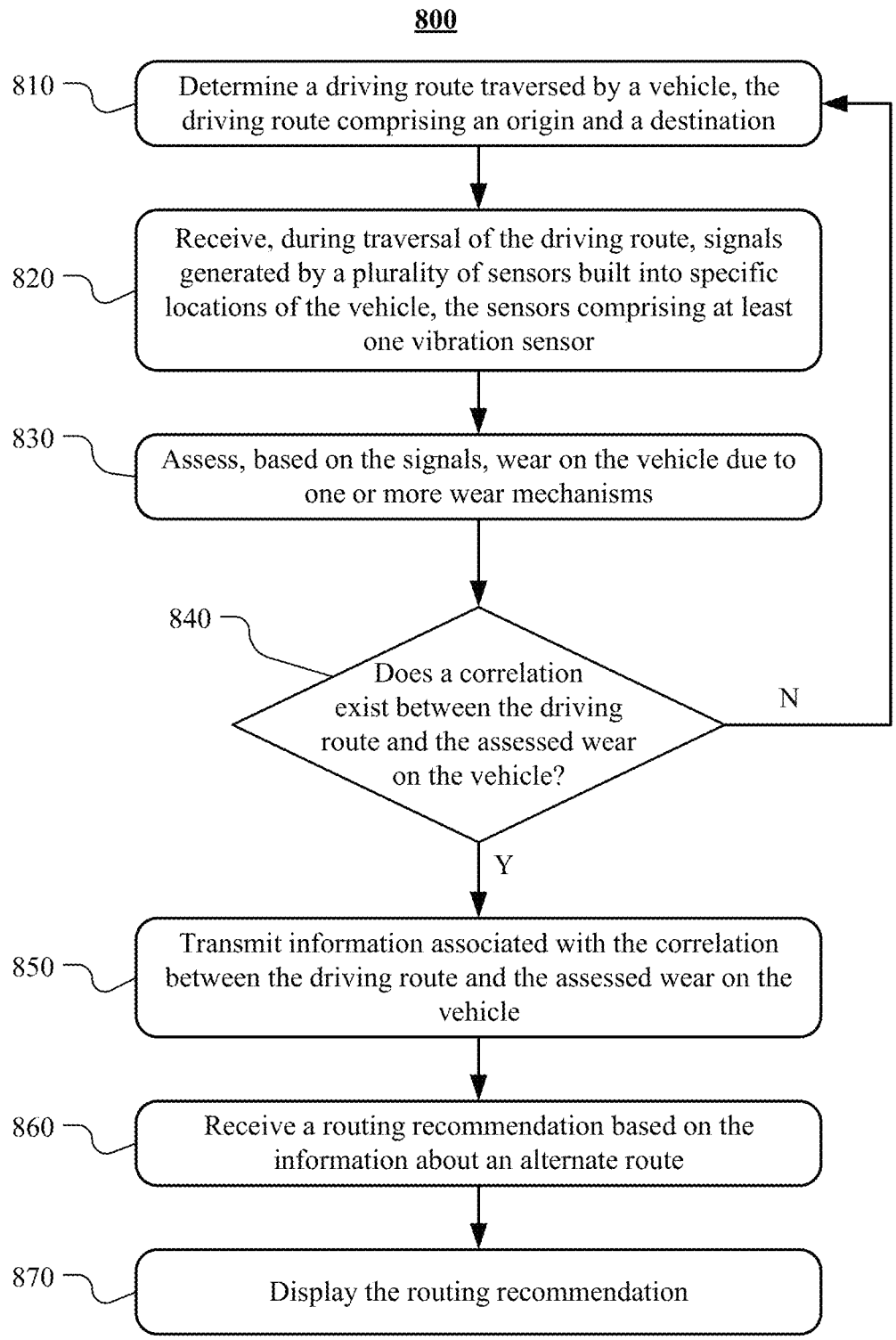
FIG. 8 is a flowchart illustrating a method of assessing driving routes to mitigate wear on a vehicle.

Turning now to FIG. 8, a flowchart of method 800 of assessing driving routes to mitigate wear on a vehicle is shown, according to an exemplary embodiment. In various embodiments, an on-board module and/or a cloud-based data processing system perform method 800. Method 800 is described in reference to the on-board module, however it should be understood that other processing systems may perform method 800. At step 810, the on-board module may determine a driving route traversed by a vehicle. In various embodiments, the driving route includes an origin and a destination. For example, the driving route may correspond to a delivery route for a delivery vehicle where the origin includes a dispatch location and the destination includes the dispatch location (e.g., such that the delivery vehicle conducts a number of deliveries and returns to a dispatch location). As another example, the driving route may correspond to a delivery route where the origin includes a previous delivery location and the destination includes a future delivery location. In some embodiments, determining the driving route includes identifying a route routinely driven by a vehicle (e.g., a delivery route, etc.).

At step 820, the on-board module may receive signals generated by a number of sensors built into specific locations on the vehicle. In various embodiments, the signals are generated during traversal of the driving route. For example, the signals may include vibration data associated with component vibrations caused by traversing a road. In various embodiments, the sensors include at least one vibration sensor. For example, the sensors may include a vibration sensor positioned on a component of the vehicle. Additionally or alternatively, the sensors may include a camera and/or a microphone. For example, the on-board module may receive image data from a camera positioned to capture images of a road surface the vehicle is traveling on. In various embodiments, the signals include timeseries data.

At step 830, the on-board module may assess wear on the vehicle due to one or more wear mechanisms based on the signals. For example, the on-board module may apply a transfer function to the vibration data to generate a measure of stress at a component and may compute a rainflow matrix using the measure of stress to determine an amount of wear associated with the component as described above. In some embodiments, step 830 includes determining a measure of wear associated with individual components/subcomponents. Additionally or alternatively, step 830 may include determining a measure of wear for the vehicle as a whole (e.g., by aggregating the component-level wear, etc.).

At step 840, the on-board module may determine whether a correlation between the driving route and the assessed wear on the vehicle exists. For example, the on-board module may perform a regression analysis and/or a Bayesian inference analysis. As another example, the on-board module may compute a $R^2$ value describing a relationship between the route and an accumulation of wear associated with a component of the vehicle. If a correlation does not exist (no), then method 800 may proceed with step 810. For example, the on-board module may only generate routing recommendations if it can determine a correlation between a route and vehicle wear. If a correlation does exist (yes), then method 800 may proceed with step 850.

At step 850, the on-board module may transmit information associated with the correlation between the driving route and the assessed wear on the vehicle. For example, the on-board module may transmit the information to a cloud-based data processing system. In various embodiments, the information includes identified road surface characteristics, measures of wear associated with the identified road surface characteristics, locations associated with the identified road surface characteristics, waypoints associated with the driving route, and/or the like. In some embodiments, the information includes a confidence factor describing a confidence in the level of correlation (e.g., a $R^2$ value, etc.).

At step 860, the on-board module may receive a routing recommendation based on the information about an alternate route. For example, the on-board module may receive a routing recommendation including a route from the cloud-based data processing system. In various embodiments, the cloud-based data processing system assesses one or more alternate routes based on (i) the comparison between the correlation between the driving route and the assessed wear on the vehicle and (ii) historical vehicle sensor information received for the alternate route. The historical vehicle sensor information may include wear measurements associated with previously traversed routes. In various embodiments, the routing recommendation is based on assessing a number of candidate routes to identify a route that produces less wear than the driving route. For example, the cloud-based data processing system may implement the function:

$$\text{Score} = \sum_{i=1}^{n} K_i P_i$$

where $K_i$ is a weight associated with the ith parameter, $P_i$, and n is the number of parameters. In various embodiments, the parameters may include (i) route distance, (ii) travel time associated with the route, (iii) wear associated with the route, and/or (iv) environmental impact associated with the route. In various embodiments, each weight, $K_i$, is unique to each parameter. For example, to prioritize reducing wear, a large $K_i$ may be used. In various embodiments, the routes are assessed based on the associated score. For example, the candidate route having the lowest score may be selected for the routing recommendation.

At step 870, the on-board module may display the routing recommendation. In various embodiments, step 870 includes displaying the routing recommendation to a user via an interface of the vehicle. Additionally or alternatively, step 870 may include displaying the routing recommendation to a fleet manager. For example, the cloud-based data processing system may transmit a message to a fleet management system to cause the fleet management system to display the routing recommendation to a fleet manager. In various embodiments, displaying the routing recommendation includes displaying one or more of the parameters associated with the route (e.g., the route distance, the travel time associated with the route, the wear associated with the route, etc.).

Figure 9:
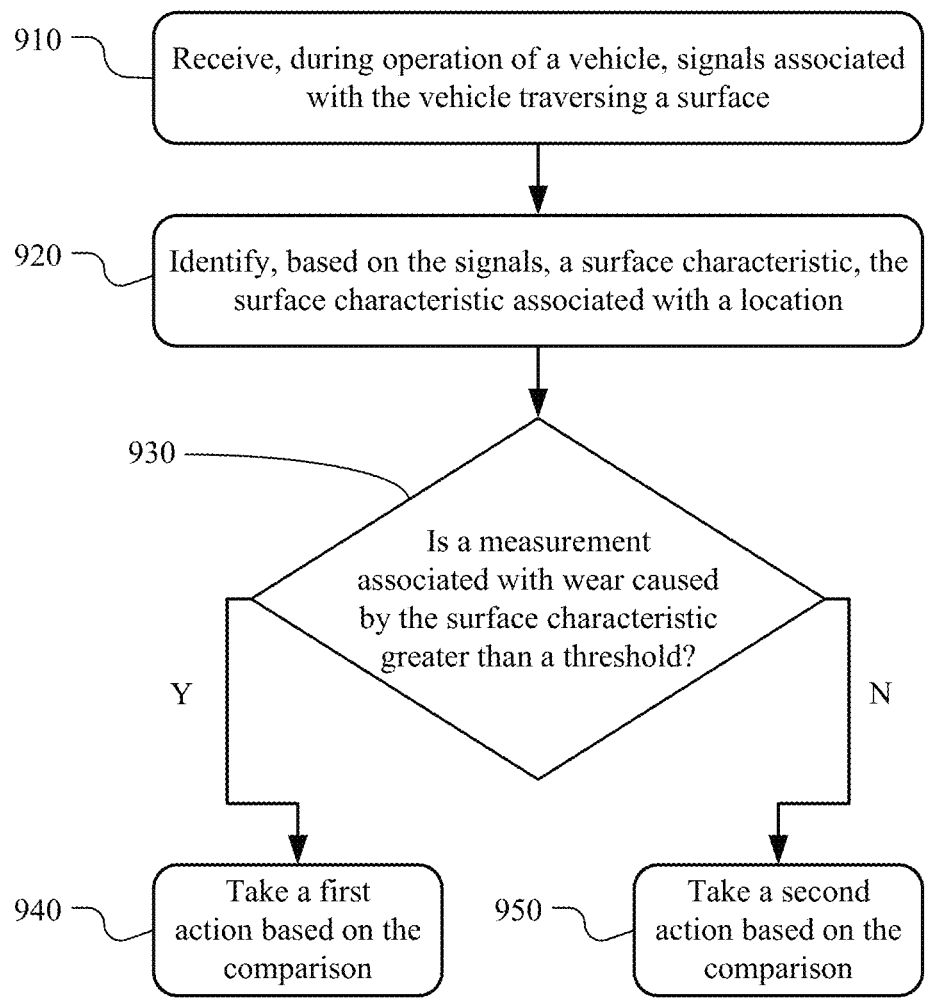
FIG. 9 is a flowchart illustrating a method of performing an action based on a measurement of wear.

Turning now to FIG. 9, a flowchart illustrating method 900 of performing an action based on a measurement of wear is shown, according to an exemplary embodiment. In various embodiments, an on-board module executes method 900 to identify surface characteristics and perform an action in response to identifying the surface characteristics. At step 910, the on-board module may receive signals associated with a vehicle traversing a surface. In various embodiments, the signals are generated during operation of the vehicle. For example, the on-board module may receive vibration data generated by a number of vibration sensors during traversal of a driving route. In various embodiments, the signals include vibration data. Additionally or alternatively, the signals may include image data and/or sound data. In some embodiments, the signals include location data (e.g., a GPS location, etc.).

At step 920, the on-board module may identify a surface characteristic based on the signals. For example, the on-board module may analyze vibration data using a deep-learning AI model to identify various surface characteristics. In various embodiments, the surface characteristic is associated with a location. In various embodiments, step 920 includes comparing expected vibration data to measured vibration data. For example, the on-board module may identify a micro event by determining whether the comparison between expected vibration data and measured vibration data exceeds a threshold. In some embodiments, the on-board module implements the function:

IF((expected sensor signal pattern−measured sensor signal pattern)>threshold)→generate flag where flag represents a violation of the on-board module's expectations of the road surface characteristics. For example, if the vehicle is traveling on a smooth surface and suddenly encounters a pothole (causing unexpected vibrations to the vehicle), the on-board module may generate the flag. As another example, if the vehicle is traveling on a rough surface and suddenly encounters a curb that causes a much larger vibration on the vehicle than the other elements of the rough surface, the on-board module may generate the flag.

At step 930, the on-board module may determine whether a measurement of wear associated with wear caused by the surface characteristic is greater than a threshold. For example, in response to generating the flag, the on-board module may compare a measure of wear associated with the surface characteristic that caused the flag to be generated to a threshold. In various embodiments, step 930 includes computing a measure of wear. For example, the on-board module may apply a transfer function to vibration data to generate a measure of component stress and may compute a rainflow matrix using the measure of component stress to generate a measure of accumulated wear associated with the component. If the measurement is not greater than the threshold (no), then method 900 may proceed with step 950. If the measurement is greater than the threshold (yes), then method 900 may proceed with step 940.

At step 940, the on-board module may perform a first action based on the comparison. For example, the on-board module may store a tuple including the measure of wear and a location associated with the surface characteristic in a data structure. In some embodiments, step 940 includes performing additional analysis. For example, the on-board module may classify the surface characteristic as a macro event or a micro event. As another example, the on-board module may classify the surface characteristic based on the physical structure associated with the surface characteristic (e.g., a pothole, a speedbump, a crack, raveling, etc.). In some embodiments, step 940 includes combining vibration data with other sensor signals such as image data and/or sound data. At step 950, the on-board module may perform a second action based on the comparison. For example, the on-board module may forgo storing a tuple representing the surface characteristic.

Figure 10:
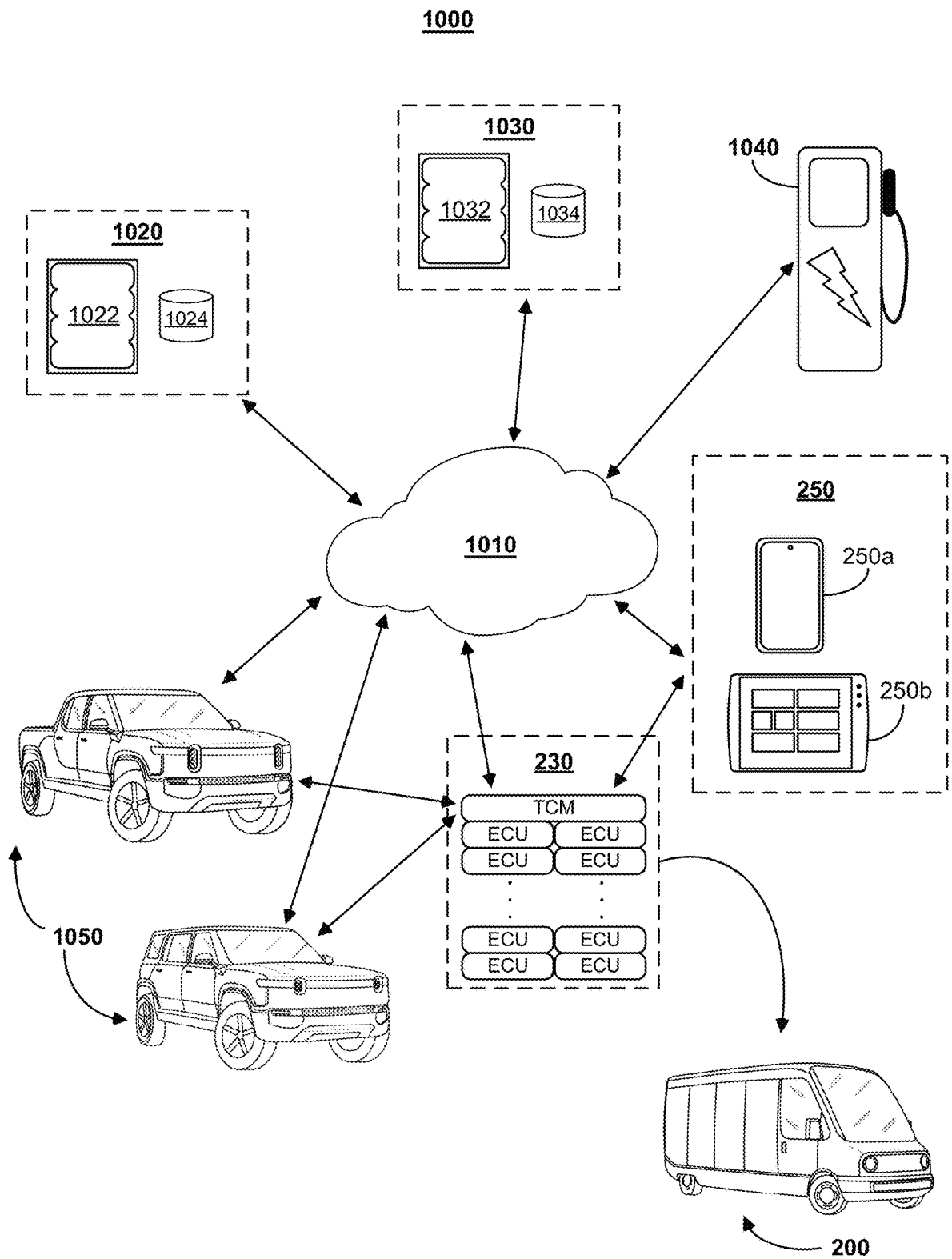
FIG. 10 illustrates an example network system including a connected vehicle.

FIG. 10 illustrates an example networked environment 1000. Computer system 1000 may include a connected vehicle 200 with a control system 230 that is capable of transmitting data to/from a network 1010. Network 1010 may also be connected to one or more computing servers 1020 (e.g., including compute units 1022 and storage units 1024) associated with a vehicle manufacturer, a vehicle service provider, a vehicle fleet operator, or a vehicle-charging facility provider. Network 1010 may also be connected to one or more third-party computing servers 1030 (e.g., including compute units 1032 and storage units 1034) associated with, for example, a smart accessory manufacturer, a group event organizer, service provider, or a governmental organization. Networked environment 1000 may include one or more landscape features 1040 (e.g., automated toll road sensors, smart road signs or road markers, automated toll gates, power dispensers at charging stations). Networked environment 1000 may also include other connected vehicles 1050 that may be capable of communicating with vehicle 200 through network 1010 and/or directly with vehicle 200 (e.g., by communicating with a TCM ECU of a control system 230 of vehicle 200 when connected vehicle 1050 is within range of a short-range communications network, such as Bluetooth). Networked environment 1000 may also include one or more computing devices 250 (e.g., smartphone 250*a*, a tablet computing device 250*b*, or a smart vehicle accessory) capable of communicating with network 1010 and/or directly with vehicle 200.

Networked environment 1000 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 200 to deduct a toll from a specified account and provides confirmation of the transaction). In particular embodiments, one or more elements of networked environment 1000 may include one or more computer systems, as described in further detail with respect to FIG. 11A. In particular embodiments, one or more elements of networked environment 1000 perform one or more steps of one or more methods described or illustrated herein. In particular embodiments, software running on one or more elements of networked environment 1000 may be controlled by a single entity to perform one or more steps of one or more methods described or illustrated herein or provide functionality described or illustrated herein.

Figures 11A, 11B:
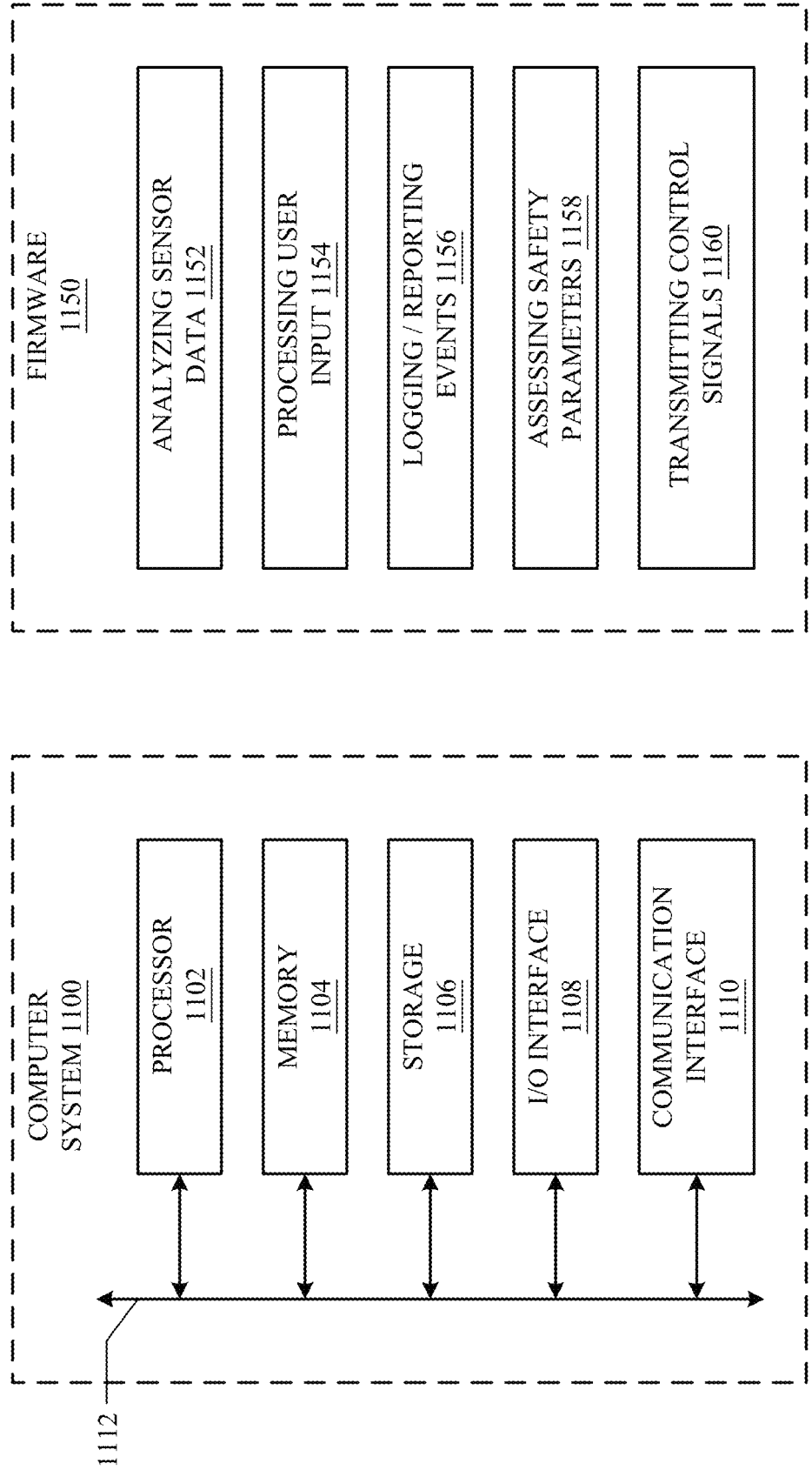
FIG. 11A is a schematic of an example computer system.
FIG. 11B illustrates example firmware for a vehicle ECU.

FIG. 11A illustrates an example computer system 1100. Computer system 1100 may include a processor 1102, memory 1104, storage 1106, an input/output (I/O) interface 1108, a communication interface 1110, and a bus 1112. Although this disclosure describes one example computer system including specified components in a particular arrangement, this disclosure contemplates any suitable computer system with any suitable number of any suitable components in any suitable arrangement. As an example and not by way of limitation, computer system 1100 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1100 may include one or more computer systems 1100; be unitary or distributed; span multiple locations, machines, or data centers; or reside in a cloud, which may include one or more cloud components in one or more networks. Where appropriate, computer system(s) 1100 may perform, at different times or at different locations, in real time or in batch mode, one or more steps of one or more methods described or illustrated herein.

Processor 1102 (e.g., compute units 1022 and 1032) may include hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106 (e.g., storage units 1024 and 1034). Processor 1102 may include one or more internal caches for data, instructions, or addresses.

In particular embodiments, memory 1104 includes main memory for storing instructions for processor 1102 to execute or data for processor 1102 to operate on. In particular embodiments, one or more memory management units (MMUs) reside between processor 1102 and memory 1104 and facilitate accesses to memory 1104 requested by processor 1102. In particular embodiments, memory 1104 includes random access memory (RAM). This disclosure contemplates any suitable RAM.

In particular embodiments, storage 1106 includes mass storage for data or instructions. As an example and not by way of limitation, storage 1106 may include a removable disk drive, flash memory, an optical disc, a magneto-optical disc, magnetic tape, or a Universal Serial Bus (USB) drive or two or more of these. Storage 1106 may include removable or fixed media and may be internal or external to computer system 1100. Storage 1106 may include any suitable form of non-volatile, solid-state memory or read-only memory (ROM).

In particular embodiments, I/O interface 1108 includes hardware, software, or both, providing one or more interfaces for communication between computer system 1100 and one or more input and/or output (I/O) devices. Computer system 1100 may be communicably connected to one or more of these I/O devices, which may be incorporated into, plugged into, paired with, or otherwise communicably connected to vehicle 200 (e.g., through the TCM ECU). An input device may include any suitable device for converting volitional user input into digital signals that can be processed by computer system 1100, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 210 described above. An output device may include devices designed to receive digital signals from computer system 1100 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1108 for them. I/O interface 1108 may include one or more I/O interfaces 1108, where appropriate.

In particular embodiments, communication interface 1110 includes hardware, software, or both providing one or more interfaces for data communication between computer system 1100 and one or more other computer systems 1100 or one or more networks. Communication interface 1110 may include one or more interfaces to a controller area network (CAN) or to a local interconnect network (LIN). Communication interface 1110 may include one or more of a serial peripheral interface (SPI) or an isolated serial peripheral interface (isoSPI). In some embodiments, communication interface 1110 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1112 includes hardware, software, or both coupling components of computer system 1100 to each other. Bus 1112 may include any suitable bus, as well as one or more buses 1112, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 11B illustrates example firmware 1150 for a vehicle ECU 1100 as described with respect to control system 230. Firmware 1150 may include functions 1152 for analyzing sensor data based on signals received from sensors 210 or cameras 220 received through communication interface 1110. Firmware 1150 may include functions 1154 for processing user input (e.g., directly provided by a driver of or passenger in vehicle 200 or provided through a computing device 250) received through I/O interface 1108. Firmware 1150 may include functions 1156 for logging detected events (which may be stored in storage 1106 or uploaded to the cloud), as well as functions for reporting detected events (e.g., to a driver or passenger of the vehicle through an instrument display or interactive interface of the vehicle, or to a vehicle manufacturer, service provider, or third party through communication interface 1110). Firmware 1150 may include functions 1158 for assessing safety parameters (e.g., monitoring the temperature of a vehicle battery or the distance between vehicle 200 and nearby vehicles). Firmware 1150 may include functions 1160 for transmitting control signals to components of vehicle 200, including other vehicle ECUs 1100.

Particular embodiments may repeat one or more steps of the methods of FIGS. 3, 4, 5, 8, and/or 9, where appropriate. Although this disclosure describes and illustrates particular steps of the methods of FIGS. 3, 4, 5, 8, and/or 9 as occurring in a particular order, this disclosure contemplates any suitable steps of the methods of FIGS. 3, 4, 5, 8, and/or 9 occurring in any suitable order. Moreover, although this disclosure describes and illustrates example methods for (i) computing wear for a vehicle and ranking a number of vehicles, (ii) computing component wear, (iii) monitoring wear for a vehicle, (iv) assessing driving routes to mitigate wear on a vehicle, and (v) generating a recommendation based on an alternate route including the particular steps of the methods of FIGS. 3, 4, 5, 8, and/or 9, this disclosure contemplates any suitable method for the methods described above including any suitable steps, which may include all, some, or none of the steps of the methods of FIGS. 3, 4, 5, 8, and/or 9, where appropriate. Furthermore, although this disclosure describes and illustrates particular components, devices, or systems carrying out particular steps of the methods of FIGS. 3, 4, 5, 8, and/or 9, this disclosure contemplates any suitable combination of any suitable components, devices, or systems carrying out any suitable steps of the methods of FIGS. 3, 4, 5, 8, and/or 9.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for assessing driving routes to mitigate wear on a vehicle, the method comprising:
   determining, by a control module of the vehicle, a driving route traversed by the vehicle, the driving route comprising an origin, a destination, and physical characteristics of roads along the driving route;
   receiving, by a control module of the vehicle during traversal of the driving route, signals generated by a plurality of sensors built into specific locations on the vehicle, the sensors comprising at least one vibration sensor;
   assessing, by the control module of the vehicle based on the signals, wear on the vehicle due to one or more wear mechanisms;
   identifying, by the control module of the vehicle, a correlation between the physical characteristics of the roads along the driving route and the assessed wear on the vehicle, comprising:
   identifying, by the control module of the vehicle based on the signals, a surface characteristic associated with the driving route;
   comparing, by the control module of the vehicle, a measurement associated with the assessed wear to a threshold to generate a result; and
   correlating, by the control module of the vehicle based on the identified surface characteristic and the result, a location associated with the driving route to a portion of the assessed wear;
   transmitting, by a telecommunications module of the vehicle to a vehicle data analysis system, information associated with the correlation between the driving route and the assessed wear on the vehicle, wherein transmitting the information associated with the correlation comprises transmitting the location and the portion of the assessed wear;
   receiving, by the telecommunications module from the vehicle data analysis system, a routing recommendation based on information about an alternate route predicted to result in less wear on the vehicle; and
   displaying, by a display module of the vehicle, the routing recommendation.

2. The method of claim 1, wherein assessing the wear on the vehicle comprises at least one of: (i) applying a machine learning (ML) model trained to predict component wear to at least a first portion of the signals, (ii) applying a transfer function to at least a second portion of the signals, or (iii) generating a frequency domain representation of at least a third portion of the signals.

3. The method of claim 1, wherein assessing the wear on the vehicle comprises determining a measure of fatigue cycles associated with a component of the vehicle based on at least a portion of the signals.

4. The method of claim 1, wherein identifying the correlation between the driving route and the assessed wear comprises classifying the surface characteristic based on the signals.

5. The method of claim 4, wherein transmitting the information comprises transmitting the classification of the surface characteristic.

6. The method of claim 1, wherein the surface characteristic comprises at least one of: (i) a road texture, (ii) a pothole, (ii) a speed bump, (iii) a crack, (iv) raveling, (v) a curb, or (vi) a parking block.

7. The method of claim 1, wherein the routing recommendation comprises the alternate route, and wherein the alternate route is correlated with a lower level of wear than the driving route.

8. A method for assessing driving routes to mitigate wear on a vehicle, the method comprising:
   determining, by a control module of the vehicle, a driving route traversed by the vehicle, the driving route comprising an origin, a destination, and physical characteristics of roads along the driving route;
   receiving, by a control module of the vehicle during traversal of the driving route, signals generated by a plurality of sensors built into specific locations on the vehicle, the sensors comprising at least one vibration sensor;
   assessing, by the control module of the vehicle based on the signals, wear on the vehicle due to one or more wear mechanisms;
   identifying, by the control module of the vehicle, a correlation between the physical characteristics of the roads along the driving route and the assessed wear on the vehicle;

transmitting, by a telecommunications module of the vehicle to a vehicle data analysis system, information associated with the correlation between the driving route and the assessed wear on the vehicle;

receiving, by the telecommunications module from the vehicle data analysis system, a routing recommendation based on information about an alternate route predicted to result in less wear on the vehicle; and displaying, by a display module of the vehicle, the routing recommendation, wherein the routing recommendation identifies a road lane not included in a plurality of road lanes associated with the driving route and wherein the routing recommendation is correlated with a lower level of wear than the driving route.

9. A vehicle system for assessing driving routes to mitigate wear on a vehicle comprising:

a plurality of sensors built into specific locations on the vehicle, the plurality of sensors comprising at least one vibration sensor;

a display; and one or more computing devices, comprising:

one or more non-transitory computer-readable storage media including instructions; and one or more processors coupled to the one or more storage media, the one or more processors configured to execute the instructions to:

determine a driving route traversed by the vehicle, the driving route comprising an origin and a destination;

receive signals generated during traversal of the driving route by the plurality of sensors;

assess, based on the signals, wear on the vehicle due to one or more wear mechanisms;

identify a correlation between the driving route and the assessed wear on the vehicle, comprising:

identifying a surface characteristic associated with the driving route;

comparing a measurement associated with the assessed wear to a threshold to generate a result; and correlating, based on the identified surface characteristic and the result, a location associated with the driving route to a portion of the assessed wear;

transmit, to a vehicle data analysis system, information associated with the correlation between the driving route and the assessed wear on the vehicle, wherein transmitting the information associated with the correlation comprises transmitting the location and the portion of the assessed wear;

receive, from the vehicle data analysis system, a routing recommendation based on information about an alternate route; and display, using the display, the routing recommendation.

10. The vehicle system of claim 9, wherein assessing the wear on the vehicle comprises at least one of (i) applying a machine learning (ML) model trained to predict component wear to at least a first portion of the signals, (ii) applying a transfer function to at least a second portion of the signals, or (iii) generating a frequency domain representation of at least a third portion of the signals.

11. The vehicle system of claim 9, wherein assessing the wear on the vehicle comprises determining a measure of fatigue cycles associated with a component of the vehicle based on at least a portion of the signals.

12. The vehicle system of claim 9, wherein identifying the correlation between the driving route and the assessed wear comprises classifying the surface characteristic based on the signals.

13. The vehicle system of claim 12, wherein transmitting the information comprises transmitting the classification of the surface characteristic.

14. The vehicle system of claim 9, wherein the surface characteristic comprises at least one of: (i) a road texture, (ii) a pothole, (iii) a speed bump, (iii) a crack, (iv) raveling, (v) a curb, or (vi) a parking block.

15. The vehicle system of claim 9, wherein the routing recommendation comprises the alternate route, wherein the alternate route identifies a road lane not included in the driving route, and wherein the alternate route is correlated with a lower level of wear than the driving route.

16. A non-transitory computer-readable medium comprising instructions that, when executed by one or more processors of one or more computing devices, cause the one or more processors to:

determine a driving route traversed by a vehicle, the driving route comprising an origin and a destination;

receive signals generated by a plurality of sensors built into specific locations on the vehicle, the signals generated during traversal of the driving route, wherein the sensors comprise at least one vibration sensor;

assess, based on the signals, wear on the vehicle due to one or more wear mechanisms;

identify a correlation between the driving route and the assessed wear on the vehicle;

cause a telecommunications module to transmit to a vehicle data analysis system information associated with the correlation between the driving route and the assessed wear on the vehicle;

receive, from the vehicle data analysis system, a routing recommendation based on information about an alternate route; and cause a display of the vehicle to display the routing recommendation, wherein the routing recommendation identifies a road lane not included in a plurality of road lanes associated with the driving route and wherein the routing recommendation is correlated with a lower level of wear than the driving route.

* * * * *